US009662270B2

(12) United States Patent
Nojima et al.

(10) Patent No.: US 9,662,270 B2
(45) Date of Patent: May 30, 2017

(54) FILM FOR LIQUID PACKAGING CONTAINERS AND LIQUID PACKAGING CONTAINER

(71) Applicant: KURARAY CO., LTD., Kurashiki-shi (JP)

(72) Inventors: Yusuke Nojima, Kamisu (JP); Yusuke Tanaka, Kamisu (JP); Yosuke Jogo, Kamisu (JP); Shinya Oshita, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/118,673

(22) PCT Filed: Sep. 3, 2015

(86) PCT No.: PCT/JP2015/075135

§ 371 (c)(1),
(2) Date: Aug. 12, 2016

(87) PCT Pub. No.: WO2016/039257

PCT Pub. Date: Mar. 17, 2016

(65) Prior Publication Data

US 2017/0042766 A1 Feb. 16, 2017

(30) Foreign Application Priority Data

Sep. 8, 2014 (JP) ................................ 2014-182072
Feb. 17, 2015 (JP) ................................ 2015-028536

(51) Int. Cl.

*A61J 1/05* (2006.01)
*A61J 1/14* (2006.01)

(Continued)

(52) U.S. Cl.

CPC ............... *A61J 1/1468* (2015.05); *A61J 1/10* (2013.01); *B32B 25/08* (2013.01); *B32B 25/12* (2013.01);

(Continued)

(58) Field of Classification Search

CPC . A61J 1/10; B65D 65/40; B32B 27/08; B32B 27/302; B32B 27/32; B32B 25/08;

(Continued)

(56) References Cited

U.S. PATENT DOCUMENTS 5,264,488 A 11/1993 Takeuchi et al.
5,529,821 A * 6/1996 Ishikawa ................ B32B 27/08 428/34.1
6,977,105 B1 * 12/2005 Fujieda ................ A61L 29/126 138/137

FOREIGN PATENT DOCUMENTS

JP 4-314452 A 11/1992
JP 6-70971 A 3/1994

(Continued)

OTHER PUBLICATIONS

International Search Report issued Dec. 8, 2015 in PCT/JP2015/075135 filed Sep. 3, 2015.

*Primary Examiner* — Yan Lan
(74) *Attorney, Agent, or Firm* — Oblon, McClelland, Maier & Neustadt, L.L.P.

(57) ABSTRACT

A film for a liquid packaging container, comprising at least one of a layer containing a resin composition (X) containing a polypropylene resin (a) and at least one of a hydrogenated block copolymer (b), the hydrogenated block copolymer (b) being a hydrogenated product of a block copolymer containing a polymer block (A) mainly containing an aromatic vinyl compound unit, and a polymer block (B) mainly containing an isoprene (Ip) unit, a butadiene (Bd) unit, or isoprene (Ip) and butadiene (Bd) units, in the resin compo- (Continued)

sition (X), the hydrogenated block copolymer (b) having a phase separation structure having formed therein both (i) an island phase having a long axis of 1 μm or more, or a bicontinuous structure, and (ii) an island phase having a long axis of 300 nm or less, and in the resin composition (X), the mass ratio ((a)/((a)+(b))) of the polypropylene resin (a) and the hydrogenated block copolymer (b) being from 61/100 to 95/100.

18 Claims, 5 Drawing Sheets

(51) Int. Cl.

| | |
|---|---|
| ***A61J 1/10*** | (2006.01) |
| ***B65D 65/40*** | (2006.01) |
| ***C08J 5/18*** | (2006.01) |
| ***B32B 27/08*** | (2006.01) |
| ***B32B 27/30*** | (2006.01) |
| ***B32B 27/32*** | (2006.01) |
| ***B32B 25/08*** | (2006.01) |
| ***B32B 25/16*** | (2006.01) |
| ***B32B 25/12*** | (2006.01) |

(52) U.S. Cl.

CPC .............. *B32B 25/16* (2013.01); *B32B 27/08* (2013.01); *B32B 27/302* (2013.01); *B32B 27/32* (2013.01); *B65D 65/40* (2013.01); *C08J 5/18* (2013.01); *B32B 2553/00* (2013.01); *C08J 2323/14* (2013.01); *C08J 2453/02* (2013.01); *Y10T 428/1393* (2015.01)

(58) Field of Classification Search

CPC ..... B32B 25/16; B32B 25/12; B32B 2552/00; B32B 2250/24; B32B 2307/412; C08J 2323/14; C08J 2453/02; Y10T 428/13; Y10T 428/1352; Y10T 428/1393; Y10T 428/31573; Y10T 428/3175; Y10T 428/31797; Y10T 428/31855; C08L 53/02; C08L 53/025; C08L 2666/02; C08L 23/02; C08L 23/06; C08L 23/10; C08L 2205/03; C08L 2666/24

See application file for complete search history.

(56) References Cited

FOREIGN PATENT DOCUMENTS

| | | | |
|---|---|---|---|
| JP | 10-67894 | A | 3/1998 |
| JP | 2003-287163 | A | 10/2003 |
| JP | 2004-346109 | A | 12/2004 |
| JP | 2009-227917 | A | 10/2009 |
| WO | 2009/031625 | A1 | 3/2009 |
| WO | 2015/156334 | A1 | 10/2015 |

* cited by examiner crack propagation mode A crack propagation mode B

FILM FOR LIQUID PACKAGING CONTAINERS AND LIQUID PACKAGING CONTAINER

TECHNICAL FIELD

The present invention relates to a film for liquid packaging containers and a liquid packaging container.

BACKGROUND ART

A liquid packaging container for medical use, such as an infusion solution bag, having been used is formed of glass or plastics. A medical solution charged in an infusion solution bag is sealed, and then sterilized generally by such a method as steam sterilization and autoclave sterilization. An infusion solution bag formed of glass has a problem of a larger weight thereof and a higher possibility of breakage due to impact, fall or the like during transportation, than a plastic bag, and thus an infusion solution bag formed of plastics has been widely used.

An infusion solution bag formed of plastics having been used is formed of a soft vinyl chloride resin or a polyolefin, such as polyethylene and polypropylene. An infusion solution bag formed of a soft vinyl chloride resin contains a large amount of a plasticizer for imparting flexibility thereto, and therefore there is a possibility depending on the kind of the infusion solution that the plasticizer is eluted into the infusion solution, which may bring about a concern in safety. Furthermore, an infusion solution bag formed of a soft vinyl chloride resin is incinerated after used since medical instruments are disposable, but there is a problem that a toxic gas derived from the soft vinyl chloride resin is generated. Moreover, an infusion solution bag formed of a polyolefin, such as polyethylene and polypropylene, is favorable from the standpoint of hygiene since no plasticizer is contained therein, but cannot be said to be sufficient in handleability due to the low flexibility and the insufficient impact resistance thereof.

For achieving the object of providing a resin composition providing a molded article that is excellent in flexibility and transparency and also providing a medical instrument that does not generate toxic gas on incineration, has sufficient heat resistance, and withstands autoclave sterilization, there is a proposal of a resin composition containing (a) a polypropylene resin, and at least one of (b) a hydrogenated block copolymer selected from the group consisting of (b-1) a hydrogenated block copolymer having one or more of a polymer block A formed of a vinyl aromatic compound, and one or more of a polyisoprene block B having a content of a 1,2-bond and a 3,4-bond of from 10 to 75% by mol, in which the content of the vinyl aromatic compound is from 10 to 40% by weight, and 70% or more of the carbon-carbon double bonds of the polyisoprene block B are hydrogenated, (b-2) a hydrogenated block copolymer containing one or more of a polymer block A formed of a vinyl aromatic compound, and one or more of a polymer block C formed of a polymer of a mixture containing isoprene and butadiene at a weight ratio of from 5/95 to 95/5, and having a content of a 1,2-bond and a 3,4-bond of from 20 to 85% by mol, in which the content of the vinyl aromatic compound is from 10 to 40% by weight, and 70% or more of the carbon-carbon double bonds of the polymer block C are hydrogenated, and (b-3) a hydrogenated block copolymer containing one or more of a polymer block A formed of a vinyl aromatic compound, and one or more of a polybutadiene bock D having a content of a 1,2-bond of 45% by mol or more, in which the content of the vinyl aromatic compound is from 10 to 40% by weight, and 70% or more of the carbon-carbon double bonds of the polybutadiene block D are hydrogenated, in which the ratio thereof (polypropylene resin (a))/(hydrogenated block copolymer (b)) is from 10/90 to 90/10 (weight ratio) (see PTL 1).

For achieving the object of providing a tube that is excellent in transparency, flexibility, kink resistance, agglutination resistance, forceps resistance, solvent adhesiveness, low temperature impact resistance, and heat resistance, there is a proposal of a tube formed by molding a resin composition containing a hydrogenated block copolymer (a), a hydrogenated block copolymer (b), and a polyolefin resin (c), in which the hydrogenated block copolymer (a) is a hydrogenated block copolymer obtained by hydrogenating a block copolymer constituted at least by a polymer block (A) formed mainly of an aromatic vinyl compound unit and a polymer block (B) formed mainly of a butadiene unit or formed mainly of an isoprene unit and a butadiene unit, the content of the polymer block (A) is from 5 to 40% by mass with respect to the total amount of the hydrogenated block copolymer (a), the hydrogenation ratio of the polymer block (B) is 70% or more, the copolymer has a glass transition temperature of from −45 to 30° C., the hydrogenated block copolymer (b) is a hydrogenated block copolymer obtained by hydrogenating a block copolymer constituted at least by a polymer block (C) formed mainly of an aromatic vinyl compound unit and a polymer block (D) formed mainly of a butadiene unit or formed mainly of an isoprene unit and a butadiene unit, the content of the polymer block (C) is from 10 to 40% by mass with respect to the total amount of the hydrogenated block copolymer (b), the hydrogenation ratio of the polymer block (D) is 80% or more, the copolymer has a glass transition temperature of less than −45° C., the mass ratio ((a)/(b)) of the hydrogenated block copolymer (a) and the hydrogenated block copolymer (b) is from 50/50 to 95/5, and the mass ratio ((c)/((a)+(b)+(c))) of the hydrogenated block copolymer (a), the hydrogenated block copolymer (b), and the polyolefin resin (c) is from 10/100 to 60/100 (see PTL 2).

CITATION LIST

Patent Literatures

PTL 1: JP-A-10-67894
PTL 2: WO 2009/031625

SUMMARY OF INVENTION

Technical Problem

Even in the case where a liquid packaging container, such as an infusion solution bag, receives an impact, or a liquid packaging container falls down, liquid leakage due to breakage of the liquid packaging container is necessarily suppressed.

Under the circumstances, an object of the present invention is to provide a film for a liquid packaging container and a liquid packaging container that are excellent in bag breakage strength while achieving transparency and flexibility that are equivalent to or higher than the ordinary products, and a medical instrument formed of the same.

Solution to Problem

As a result of earnest investigations made by the present inventors, it has been found that in the case where a liquid packaging container for medical use has a layer formed of a particular resin that has a particular morphology, the transparency and flexibility that are equivalent to or higher than those of the ordinary products can be achieved, and the liquid packaging container provides excellent bag breakage strength, and thus the problems are solved.

The present invention relates to the following items [1] to [8].

[1] A film for a liquid packaging container, comprising at least one of a layer containing a resin composition (X) containing a polypropylene resin (a) and at least one of a hydrogenated block copolymer (b), the hydrogenated block copolymer (b) being a hydrogenated product of a block copolymer containing a polymer block (A) mainly containing an aromatic vinyl compound unit, and a polymer block (B) mainly containing an isoprene (Ip) unit, a butadiene (Bd) unit, or isoprene (Ip) and butadiene (Bd) units, in the resin composition (X), the hydrogenated block copolymer (b) having a phase separation structure having formed therein both (i) an island phase having a long axis of 1 μm or more, or a bicontinuous structure, and (ii) an island phase having a long axis of 300 nm or less, and in the resin composition (X), the mass ratio ((a)/((a)+(b))) of the polypropylene resin (a) and the hydrogenated block copolymer (b) being from 61/100 to 95/100.

[2] The film for a liquid packaging container according to the item [1], wherein the hydrogenated block copolymer (b) contains at least a hydrogenated block copolymer (b-1) and a hydrogenated block copolymer (b-2) that are different in glass transition temperature, the hydrogenated block copolymer (b-1) has a glass transition temperature of less than −45° C., the hydrogenated block copolymer (b-2) has a glass transition temperature of −45° C. or more, and in the resin composition (X), the mass ratio ((b-1)/(b-2)) of the hydrogenated block copolymer (b-1) and the hydrogenated block copolymer (b-2) is from 5/95 to 95/5.

[3] The film for a liquid packaging container according to the item [2], wherein the hydrogenated block copolymer (b-1) has a content of the polymer block (A) mainly containing an aromatic vinyl compound unit of from 5 to 38% by mass, or the hydrogenated block copolymer (b-2) has a content of the polymer block (A) mainly containing an aromatic vinyl compound unit of from 5 to 50% by mass.

[4] The film for a liquid packaging container according to any one of the items [1] to [3], wherein, with respect to the hydrogenated block copolymer (b), or the hydrogenated block copolymer (b-1) and the hydrogenated block copolymer (b-2), a hydrogenation ratio of the polymer block (B) is 80% by mol or more respectively.

[5] The film for a liquid packaging container according to any one of the items [1] to [4], wherein the hydrogenated block copolymer (b) has, or the hydrogenated block copolymer (b-1) and the hydrogenated block copolymer (b-2) have a weight average molecular weight of from 20,000 to 500,000 respectively.

[6] The film for a liquid packaging container according to any one of the items [1] to [5], wherein the polypropylene resin (a) contains 60% by mol or more of a propylene monomer unit, and has a melt flow rate of from 0.1 to 30 g/10 min under condition of 230° C. and a load of 21.6 N.

[7] A liquid packaging container containing the film for a liquid packaging container according to any one of the items [1] to [6].

[8] The liquid packaging container according to the item [7], comprising a film for a liquid packaging container that has a structure containing two or more layers including an inner layer and an outer layer, the inner layer contains the resin composition (X), and the outer layer contains a resin composition (P) containing 70% by mass or more of a polypropylene resin (c) having a content of a propylene monomer unit of 60% by mol or more.

[9] The liquid packaging container according to the item [8], comprising a film for a liquid packaging container that has a structure containing three or more layers including at least one layer of an intermediate layer between the inner layer and the outer layer, the outer layer contains a resin composition (P) containing 70% by mass or more of a polypropylene resin (c) having a content of a propylene monomer unit of 60% by mol or more, the resin composition (X) forms any of the inner layer and intermediate layer, the inner layer, and the intermediate layer, and a melting point $MP_{in}$ of a resin component constituting the inner layer and a melting point $MP_{mid}$ of a resin component constituting the intermediate layer satisfy a following inequality:

$$MP_{in}<MP_{mid}.$$

[10] The liquid packaging container according to the item [8] or [9], wherein a melting point $MP_x$ of the resin composition (X) constituting the inner layer and a melting point $MP_p$ of the resin composition (P) constituting the outer layer satisfy a following inequality:

$$0<MP_p-MP_x\leq 50.$$

[11] A medical instrument containing the liquid packaging container according to any one of the items [7] to [10].

Advantageous Effects of Invention

According to the present invention, a film for a liquid packaging container and a liquid packaging container can be provided that are excellent in bag breakage strength while achieving transparency and flexibility that are equivalent to or higher than the ordinary products. Due to these characteristics, the film for a liquid packaging container of the present invention can be favorably applied particularly to medical use.

DESCRIPTION OF EMBODIMENTS

Figure 1:
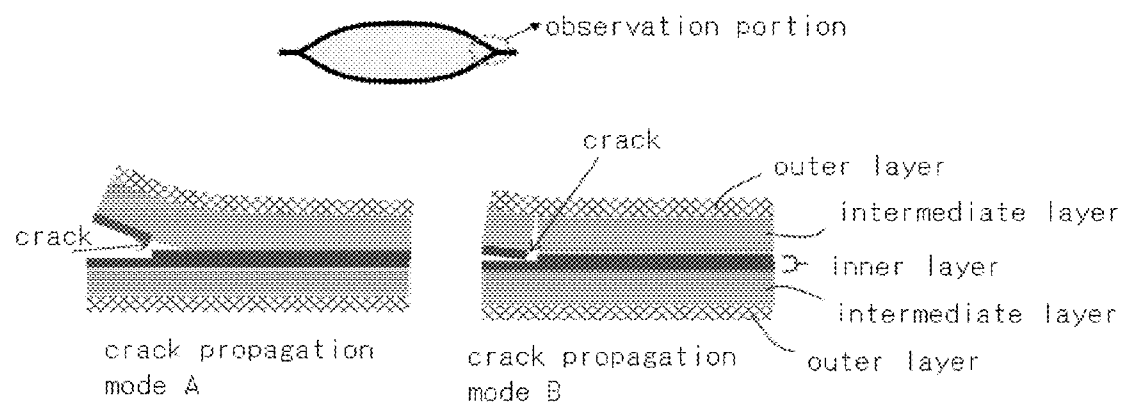
FIG. 1 is the schematic illustration showing the observation portion of the crack propagation mode, and the crack propagation mode of the liquid packaging containers of the examples and the comparative examples.

In the description herein, embodiments that are described as being preferred can be arbitrarily selected, and combinations of the embodiments that are described as being preferred can be considered as being more preferred.

Film for Liquid Packaging Container

The present invention relates to a film for a liquid packaging container, containing at least one of a layer containing a resin composition (X) containing a polypropylene resin (a) and at least one of a hydrogenated block copolymer (b).

The polypropylene resin (a) and at least one of the hydrogenated block copolymer (b) in the resin composition (X) will be described below.

Polypropylene Resin (a)

The polypropylene resin (a) is not particularly limited, and may be a known polypropylene resin, except that the polypropylene resin (a) preferably contains 60% by mol or more of a structural unit derived from propylene (i.e., a propylene monomer unit). The content of a propylene monomer unit is preferably 80% by mol or more, more preferably from 80 to 100% by mol, further preferably from 90 to 100% by mol, and particularly preferably from 95 to 99% by mol. Examples of the structural unit other than that derived from propylene include a structural unit derived from ethylene, and a structural unit derived from an α-olefin, such as 1-butene, 1-hexene, 1-heptene, 1-octene, 4-methyl-1-pentene, 1-nonene, and 1-decene, and also include a structural unit derived from the modifier described later.

Examples of the polypropylene resin (a) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. The polypropylene resin (a) may be a modified polypropylene resin obtained through graft copolymerization of the polypropylene resin with a modifier, examples of which include an unsaturated monocarboxylic acid, such as acrylic acid, methacrylic acid, and crotonic acid; an unsaturated dicarboxylic acid, such as maleic acid, citraconic acid, and itaconic acid; an ester, an amide, or an imide of the unsaturated monocarboxylic acid or the unsaturated dicarboxylic acid; and an unsubstituted dicarboxylic acid anhydride, such as maleic anhydride, citraconic anhydride, and itaconic anhydride, but the polypropylene resin (a) is preferably one that is not modified.

Among these, from the standpoint of the relative inexpensiveness and the easy availability, homopolypropylene, a propylene-ethylene random copolymer, and a propylene-ethylene block copolymer are preferred, homopolypropylene and a propylene-ethylene random copolymer are more preferred, and a propylene-ethylene random copolymer is further preferred.

The polypropylene resins (a) may be used solely or as a combination of two or more kinds thereof.

The melt flow rate (MFR) of the polypropylene resin (a) measured under condition of 230° C. and 21.6 N is preferably from 0.1 to 30 g/10 min, more preferably from 1 to 20 g/10 min, and further preferably from 1 to 10 g/10 min, from the standpoint of the molding processability of the resin composition (X). All of the "melt flow rates" described in the description herein and the claims are values that are measured according to JIS K7210.

The melting point of the polypropylene resin (a) is not particularly limited, and is preferably from 120 to 180° C., and more preferably from 120 to 170° C. All of the "melting points" described in the description herein and the claims are values that are measured according to the method described in the examples.

Hydrogenated Block Copolymer (b)

The hydrogenated block copolymer (b) is a hydrogenated product of a block copolymer containing a polymer block (A) mainly containing an aromatic vinyl compound unit, and a polymer block (B) mainly containing an isoprene (Ip) unit, a butadiene (Bd) unit, or isoprene (Ip) and butadiene (Bd) units.

The polymer block (A) and the polymer block (B) will be described below.

Polymer Block (A)

The polymer block (A) mainly contains a structural unit derived from an aromatic vinyl compound. The term "mainly containing" herein means that the structural unit derived from an aromatic vinyl compound is contained in an amount of 50% by mass or more based on the total mass of the polymer block (A). The content of the structural unit derived from an aromatic vinyl compound in the polymer block (A) is more preferably 70% by mass or more, and further preferably 90% by mass or more, based on the total mass of the polymer block (A), from the standpoint of the transparency and the mechanical characteristics of the resin composition (X).

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-, m-, or p-bromomethylstyrene, a styrene derivative substituted with a silyl group, indene, and vinylnaphthalene. Among these, from the standpoint of the production cost and the balance among the properties, styrene, α-methylstyrene, and a mixture thereof are preferred, and styrene is more preferred.

The polymer block (A) may contain an additional unsaturated monomer other than the aromatic vinyl compound in an amount of 10% by mass or less unless the objects and the advantageous effects of the present invention are impaired. Examples of the additional unsaturated monomer include at least one selected from butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-menthene, dipentene, methylenenorbornene, and 2-methylenetetrahydrofuran. In the case where the polymer block (A) contains the additional unsaturated monomer unit, the bonding mode thereof is not particularly limited, and may be any of a random form or a tapered form.

The polymer block (A) preferably has a weight average molecular weight of from 2,500 to 100,000, more preferably from 2,500 to 50,000, and further preferably from 3,000 to 30,000. All the "weight average molecular weights" described in the description herein and the claims are weight average molecular weights in terms of standard polystyrene conversion measured by the gel permeation chromatography (GPC) measurement.

The content of the polymer block (A) in the hydrogenated block copolymer (b) is preferably from 5 to 40% by mass, and more preferably from 7 to 35% by mass, from the standpoint of the rubber elasticity and the flexibility of the layer formed of the resin composition (X).

In the case where the hydrogenated block copolymer (b) contains at least a hydrogenated block copolymer (b-1) and a hydrogenated block copolymer (b-2) that are different in glass transition temperature, as described later, the content of the polymer block (A) mainly containing an aromatic vinyl compound unit in the hydrogenated block copolymer (b-1) having a glass transition temperature of less than −45° C. is preferably from 5 to 50% by mass, more preferably from 5 to 38% by mass, further preferably from 7 to 30% by mass, and still further preferably from 8 to 25% by mass, from the standpoint of the rubber elasticity, the flexibility and the moldability of the layer formed of the resin composition (X), and the productivity of the hydrogenated block copolymers (b-1) and (b-2). From the same standpoint, the content of the polymer block (A) mainly containing an aromatic vinyl compound unit in the hydrogenated block copolymer (b-2) having a glass transition temperature of −45° C. or more is preferably from 5 to 50% by mass, more preferably from 5 to 38% by mass, further preferably from 7 to 30% by mass, and still further preferably from 8 to 25% by mass.

The contents of the polymer block (A) in the hydrogenated block copolymer (b) are values that are obtained from $^{1}$H-NMR spectra.

Polymer Block (B)

The copolymer block (B) mainly contains a structural unit derived form a conjugated diene compound. The term "mainly containing" herein means that the structural unit derived from a conjugated diene compound is contained in an amount of 50% by mass or more based on the total mass of the polymer block (B). The content of the structural unit derived from a conjugated diene compound in the polymer block (B) is more preferably 70% by mass or more, and further preferably 90% by mass or more, based on the total mass of the polymer block (B).

The conjugated diene compound constituting the polymer block (B) mainly contains an isoprene (Ip) unit, a butadiene (Bd) unit, or isoprene (Ip) and butadiene (Bd) units, and may further contain, for example, at least one selected from 2,3-dimethylbutadiene, 1,3-pentadiene, 1,3-hexadine, and the like.

The polymer block (B) mainly contains an isoprene (Ip) unit, a butadiene (Bd) unit, or isoprene (Ip) and butadiene (Bd) units, and is preferably constituted mainly by a butadiene (Bd) unit or isoprene (Ip) and butadiene (Bd) units since the resulting liquid packaging container may be excellent in flexibility at a low temperature. The polymer block (B) is more preferably constituted mainly by isoprene (Ip) and butadiene (Bd) units since the resulting liquid packaging container may be excellent in transparency. The mixing ratio of the isoprene (Ip) and the butadiene (Bd) is not particularly limited, and the mixing ratio (butadiene/isoprene) (molar ratio) is preferably in a range of from 10/90 to 90/10, more preferably in a range of from 30/70 to 70/30, and further preferably in a range of from 40/60 to 60/40, from the standpoint of the enhancement of the performance, and the like. In the case where the polymer block (B) mainly contains isoprene (Ip) and butadiene (Bd) units, the bonding mode thereof is not particularly limited, and may be any of a random form, a tapered form, a completely alternate form, a partial block form, a block form, and combinations of two or more thereof.

The bonding form of the conjugated diene constituting the polymer block (B) is not particularly limited. Examples for the case of butadiene include a 1,2-bond and a 1,4-bond, and examples for the case of isoprene include a 1,2-bond, a 3,4-bond, and a 1,4-bond.

In the description herein, in the case where the polymer block (B) contains an isoprene unit, the total amount of the 1,2-bond and the 3,4-bond is referred to as an amount of a vinyl bond; in the case where the polymer block (B) is formed of a butadiene unit, the amount of the 1,2-bond is referred to as an amount of a vinyl bond; and the content of the vinyl bonds in all the bonding forms of the polymer block (B) is referred to as a vinyl content (%). The amount of the 1,2-bond and the amount of the 3,4-bond can be measured by a 1H-NMR measurement.

The polymer block (B) preferably has a weight average molecular weight of from 10,000 to 300,000, more preferably from 20,000 to 270,000, and further preferably from 40,000 to 240,000, from the standpoint of the flexibility of the resin composition (X).

From the standpoint of the heat resistance and the transparency, 80% by mol or more of the carbon-carbon double bond of the polymer block (B) is preferably hydrogenated. The hydrogenation ratio of the polymer block (B) is more preferably 85% by mol or more, and further preferably 90% by mol or more. In the case where the hydrogenated block copolymer (b) contains at least a hydrogenated block copolymer (b-1) and a hydrogenated block copolymer (b-2) that are different in glass transition temperature, as described later, the hydrogenation ratio of the hydrogenated block copolymer (b-1) and the hydrogenated block copolymer (b-2) each are preferably 80% by mol or more, more preferably 85% by mol or more, and further preferably 90% by mol or more.

The hydrogenation ratio is a value that is obtained by calculating from iodine values before and after the hydrogenation measured for the content of a carbon-carbon double bond in the structural unit derived from the conjugated diene compound in the polymer block (B).

The polymer block (B) may contain a structural unit derived from an additional polymerizable monomer other than the isoprene (Ip) unit and the butadiene (Bd) unit in an amount of generally preferably 30% by mass or less, and more preferably 10% by mass or less, based on the total mass of the polymer block (B), unless the objects and the advantageous effects of the present invention are impaired. Preferred examples of the additional polymerizable monomer include at least one compound selected from an aromatic vinyl compound, such as styrene, α-methylstyrene, o-methylstyrene, m-methylstyrene, p-methylstyrene, p-t-butylstyrene, 2,4-dimethylstyrene, vinylnaphthalene, and vinylanthracene, methyl methacrylate, methyl vinyl ether, N-vinylcarbazole, 3-pinene, 8,9-p-menthene, dipentene, methylenenorbornene, and 2-methylenetetrahydrofuran. In the case where the polymer block (B) contains the structural unit derived from the additional polymerizable monomer other than the isoprene (Ip) unit and the butadiene (Bd) unit, the bonding mode thereof is not particularly limited, and may be any of a random form or a tapered form.

Bonding Mode of Polymer Block (A) and Polymer Block (B)

The bonding mode of the hydrogenated block copolymer (b) is not particularly limited as far as the polymer block (A) and the polymer block (B) are bonded to each other, and may be a linear form, a branched form, a radial form, and a bonding mode having two or more thereof in combination. Among these, the bonding mode of the polymer block (A) and the polymer block (B) is preferably a linear form, and examples thereof include, while the polymer block (A) is represented by A, and the polymer block (B) is represented by B, a diblock copolymer represented by A-B, a triblock copolymer represented by A-B-A, a tetrablock copolymer represented by A-B-A-B, a pentablock copolymer represented by A-B-A-B-A, and an $(A-B)_nX$ type copolymer (in which X represents a residual group of a coupling agent, and n represents an integer of 3 or more). Among these, a triblock copolymer (A-B-A) is preferably used from the standpoint of the flexibility, the easiness in production, and the like of the hydrogenated block copolymer (b).

In the description herein, in the case where polymer blocks of the same kind are bonded to each other in a linear form through a divalent coupling agent or the like, the entire polymer blocks bonded are treated as one polymer block. According thereto, including the above examples, a polymer block that should be represented by Y-X-Y (in which X represents a residual group of a coupling agent) in a strict meaning is expressed totally Y except for the case where the polymer block is necessarily distinguished from a single polymer block Y. In the description herein, a polymer block of this type containing a residual group of a coupling agent is treated in the above manner, and therefore, for example, a block copolymer that contains a residual group of a coupling agent and should be represented by A-B-X-B-A (in which X represents a residual group of a coupling agent) in a strict meaning is represented by A-B-A and is treated as one example of a triblock copolymer.

The hydrogenated block copolymer (b) may have present therein a polymer block (C) formed of an additional polymerizable monomer other than the polymer block (A) and the polymer block (B) in such a range that does not impair the objects of the present invention. In this case, while the polymer block (C) is represented by C, examples of the structure of the block copolymer include an A-B-C type triblock copolymer, an A-B-C-A type tetrablock copolymer, and an A-B-A-C type tetrablock copolymer.

The hydrogenated block copolymer (b), and the hydrogenated block copolymer (b-1) and the hydrogenated block copolymer (b-2) that are different in glass transition temperature described later each preferably have a weight average molecular weight of from 20,000 to 500,000, more preferably from 35,000 to 400,000, and further preferably from 40,000 to 300,000. In the case where the weight average molecular weight of the hydrogenated block copolymer (b) is less than 20,000, the heat resistance of the resin composition (X) may be lowered, and in the case where it exceeds 500,000, the molding processability of the resin composition (X) may be insufficient.

The hydrogenated block copolymer (b) may have in the molecular chain thereof and/or at the molecular end thereof one or more kinds of a functional group, such as a carboxyl group, a hydroxyl group, an acid anhydride group, an amino group, and an epoxy group unless the objects and the advantageous effects of the present invention are impaired.

The flowability of the hydrogenated block copolymer (b) in terms of melt flow rate measured at 230° C. and 21.6 N is preferably from 0.1 to 80 g/10 min, and more preferably from 1 to 50 g/10 min, from the standpoint of the enhancement of the molding processability of the resin composition (X).

Production Method of Hydrogenated Block Copolymer (b)

The hydrogenated block copolymer (b) can be produced by a solution polymerization method, an emulsion polymerization method, a solid phase polymerization method, and the like. Among these, a solution polymerization method is preferred, and examples thereof that can be applied include known polymerization methods including an ion polymerization method, such as an anion polymerization method and a cation polymerization method, and a radical polymerization method. Among these, an anion polymerization method is preferred. In an anion polymerization method, the hydrogenated block copolymer (b) can be obtained in such a manner that an aromatic vinyl compound and a conjugated diene compound are added sequentially in the presence of a solvent, an anion polymerization initiator, and depending on necessity a Lewis base, so as to provide a block copolymer, and the block copolymer is then hydrogenated.

Examples of an organic lithium compound that is used as the polymerization initiator in the above method include a monolithium compound, such as methyllithium, ethyllithium, pentyllithium, n-butyllithium, sec-butyllithium, and tert-butyllithium, and a dilithium compound, such as tetraethylene dilithium.

The solvent is not particularly limited unless the anion polymerization reaction is adversely affected thereby, and examples thereof include an aliphatic hydrocarbon, such as cyclohexane, methylcyclohexane, n-hexane, and n-pentane, and an aromatic hydrocarbon, such as benzene, toluene, and xylene. The polymerization reaction is generally performed at from 0 to 100° C. for from 0.5 to 50 hours.

After performing the polymerization in the above manner, the polymerization reaction is terminated by adding an active hydrogen compound, such as an alcohol compound, a carboxylic acid compound, and water, and the block copolymer is then hydrogenated according to a known method in an inert organic solvent in the presence of a hydrogenation catalyst, thereby providing a hydrogenated product. The hydrogenation reaction may be performed in the presence of a hydrogenation catalyst under condition of a reaction temperature of from 20 to 100° C. and a hydrogen pressure of from 0.1 to 10 MPa.

Examples of the hydrogenation catalyst include Raney nickel; a heterogeneous catalyst containing a support, such as carbon, alumina, and diatom earth, having supported thereon a metal, such as Pt, Pd, Ru, Rh, and Ni; a Ziegler catalyst containing a combination of a transition metal compound with an alkylaluminum compound, an alkyllithium compound, or the like; and a metallocene catalyst.

The hydrogenated block copolymer (b) thus obtained can be collected in such a manner that the polymerization reaction solution is aggregated by pouring into methanol or the like, and then dried by heating or depressurizing, or in alternative, the polymerization reaction solution is subjected to so-called steam stripping, in which the polymerization reaction solution is poured into hot water along with steam, so as to remove the solvent through azeotropy, and then dried by heating or depressurizing.

For the production method of the hydrogenated block copolymers (b), (b-1), and (b-2), the hydrogenated block copolymers may be produced according to the descriptions in JP-A-10-67894 and WO 2009/031625, and the description in WO 2009/031625 is incorporated in the description herein by reference.

Resin Composition (X)

The resin composition (X) contains the polypropylene resin (a) and at least one of the hydrogenated block copolymer (b), and in the resin composition (X), the hydrogenated block copolymer (b) has a phase separation structure having formed therein both (i) an island phase having a long axis of 1 μm or more, or a bicontinuous structure, and (ii) an island phase having a long axis of 300 nm or less.

In the case, for example, where one kind of the hydrogenated block copolymer (b) forms a phase separation structure having formed therein both (i) an island phase having a long axis of 1 μm or more, or a bicontinuous structure, and (ii) an island phase having a long axis of 300 nm or less, the resin composition (X) having a phase separation structure can be produced, for example, in such a manner that the hydrogenated block copolymer (b) is kneaded in the polypropylene resin (a) with a high shearing force, and thus is dispersed therein to form an island phase having a long axis of 300 nm or less, and then the hydrogenated block copolymer (b) is kneaded therein with a low shearing force, and thus is dispersed therein to form an island phase having a long axis of 1 am or more, or a bicontinuous structure.

In the resin composition (X), at least one kind of the hydrogenated block copolymer (b) is present in an island phase having a long axis of 1 am or more, preferably an island phase having a long axis of 1.1 μm or more and 5 μm or less, and more preferably an island phase having a long axis of 1.2 μm or more and 3 μm or less, or a bicontinuous structure. In the following description, the "island phase having a long axis of 1 μm or more" may also be referred to as a "large island phase".

In the resin composition (X), the hydrogenated block copolymer (b) that is the same kind as or a different kind from the hydrogenated block copolymer (b) is present in an island phase having a long axis of 300 nm or less, preferably an island phase having a long axis of 1 nm or more and 200 nm or less, and more preferably an island phase having a long axis of 10 nm or more and 100 nm or less. In the following description, the "island phase having a long axis of 300 nm or less" may also be referred to as a "small island phase".

In the resin composition (X), the hydrogenated block copolymer (b) forms a particular morphology that has a phase separation structure having formed therein both the large island phase or the bicontinuous structure, and the small island phase, as shown in A of FIG. 4, which is a schematic illustration based on an image obtained by scanning with an atomic force microscope along the machine direction (MD) in the film production described later. Due to the structure, even in the case where a layer formed of the resin composition (X) is cracked, the crack propagates in the machine direction (MD) of the film for a liquid packaging container along the large island phase or the bicontinuous structure of the hydrogenated block copolymer (b), which is oriented in the machine direction (MD) of the film for a liquid packaging container in the resin composition (X) and has poor compatibility with the polypropylene resin (a). Accordingly, it is expected that the propagation of the crack in the thickness direction of the layer is prevented, thereby providing an excellent bag breakage strength. On the other hand, it is also expected that the small island phase of the hydrogenated block copolymer (b), which has good compatibility with the polypropylene resin (a), is dispersed substantially homogeneously in the resin composition (X), and thus the layer formed of the resin composition (X) is excellent in flexibility and transparency.

It is preferred in the present invention that the hydrogenated block copolymer (b) contains at least a hydrogenated block copolymer (b-1) and a hydrogenated block copolymer (b-2) that are different in glass transition temperature, in which the hydrogenated block copolymer (b-1) has a glass transition temperature of less than −45° C., and the hydrogenated block copolymer (b-2) has a glass transition temperature of −45° C. or more. It is considered that the hydrogenated block copolymer (b) that contains hydrogenated block copolymers (b-1) and (b-2) that are different in glass transition temperature facilitates the formation of the phase separation structure having both the large island phase or the bicontinuous structure, and the small island phase in the resin composition (X). In the resin composition (X), the hydrogenated block copolymer (b-1) has a tendency of forming an island phase having a long axis of 1 μm or more, or a bicontinuous structure, and the hydrogenated block copolymer (b-2) has a tendency of forming an island phase having a long axis of 300 nm or less.

In the case where the hydrogenated block copolymer (b) contains at least the hydrogenated block copolymer (b-1) and the hydrogenated block copolymer (b-2), in the resin composition (X), the mass ratio ((b-1)/(b-2)) of the hydrogenated block copolymer (b-1) and the hydrogenated block copolymer (b-2) is preferably from 5/95 to 95/5, more preferably from 15/85 to 85/15, and further preferably from 40/60 to 60/40. In the case where the mass ratio of the hydrogenated block copolymer (b-1) and the hydrogenated block copolymer (b-2) is in the range, the formation of the particular morphology shown in FIG. 4 is facilitated, and as a result, a crack formed in a single layer formed of the resin composition (X) propagates in a direction that is substantially horizontal with respect to the surface of the single layer (that is to say, is substantially parallel to the surface of the single layer) but not in the thickness direction thereof as in the above mechanism, thereby enhancing the bag breakage strength.

The polymer block (B) of the hydrogenated block copolymer (b-1) having a glass transition temperature of less than −45° C. (which is hereinafter referred to as a polymer block (B-1)), in the case where the polymer block (B-1) is formed mainly of a butadiene (Bd) unit, preferably has a vinyl content (i.e., a content of the 1,2-bond) of less than 75% by mol, more preferably less than 70% by mol, and further preferably less than 60% by mol in order to satisfy the glass transition temperature. In the case where the polymer block (B-1) is formed mainly of an isoprene (Ip) unit, the polymer block (B-1) preferably has a vinyl content (i.e., a content of the 1,2-bond and the 3,4-bond) of less than 50% by mol, more preferably less than 45% by mol, and further preferably less than 40% by mol. In the case where the polymer block (B-1) is formed mainly of an isoprene (Ip) unit and a butadiene (Bd) unit, the polymer block (B-1) preferably has a vinyl content (i.e., a content of the 1,2-bond and the 3,4-bond) of less than 60% by mol, more preferably less than 55% by mol, and further preferably less than 50% by mol.

The polymer block (B) of the hydrogenated block copolymer (b-2) having a glass transition temperature of −45° C. or more (which is hereinafter referred to as a polymer block (B-2)), in the case where the polymer block (B-2) is formed mainly of a butadiene (Bd) unit, preferably has a vinyl content (i.e., a content of the 1,2-bond) of 60% by mol or more, more preferably 70% by mol or more, and further preferably 75% by mol or more in order to satisfy the glass transition temperature. In the case where the polymer block (B-2) is formed mainly of an isoprene (Ip) unit, the polymer block (B-2) preferably has a vinyl content (i.e., a content of the 1,2-bond and the 3,4-bond) of 40% by mol or more, more preferably 45% by mol or more, and further preferably 50% by mol or more. In the case where the polymer block (B-2) is formed mainly of an isoprene (Ip) unit and a butadiene (Bd) unit, the polymer block (B-2) preferably has a vinyl content (i.e., a content of the 1,2-bond and the 3,4-bond) of 50% by mol or more, more preferably 55% by mol or more, and further preferably 60% by mol or more.

Production of Hydrogenated Block Copolymers (b-1) and (b-2)

The hydrogenated block copolymers (b-1) and (b-2) can be produced in the same manner as in the production method of the hydrogenated block copolymer (b) as described above, and are preferably produced by an anion polymerization method. Specific examples thereof include a method of sequentially polymerizing an aromatic vinyl compound, a conjugated diene, and an aromatic vinyl compound with an alkyllithium compound as a polymerization initiator; a method of sequentially polymerizing an aromatic vinyl compound and a conjugated diene with an alkyllithium compound as a polymerization initiator, and then coupling the polymers with a coupling agent added; and a method of sequentially polymerizing a conjugated diene, and then an aromatic vinyl compound, with a dilithium compound as a polymerization initiator.

Examples of the alkyllithium compound include methyllithium, ethyllithium, n-butyllithium, sec-butyllithium, tert-butyllithium, and pentyllithium. Examples of the coupling agent include dichloromethane, dibromomethane, dichloroethane, dibromoethane, dibromobenzene, and phenyl benzoate. Examples of the dilithium compound include naphthalene dilithium and dilithiohexylbenzene.

The amounts of the polymerization initiator, such as the alkyllithium compound and the dilithium compound, and the coupling agent used may be appropriately determined depending on the demanded weight average molecular weights of the hydrogenated block copolymer (b-1) and the hydrogenated block copolymer (b-2) as the targets. In general, the polymerization initiator, such as the alkyllithium compound and the dilithium compound, may be used in a ratio of from 0.01 to 0.5 part by mass per 100 parts by mass in total of the polymerizable monomers applied to the polymerization, such as an aromatic vinyl compound, butadiene, and isoprene, and in the case where the coupling agent is used, the coupling agent may be used in a ratio of from 0.001 to 0.8 part by mass per 100 parts by mass in total of the polymerizable monomers.

The anion polymerization is preferably performed in the presence of a solvent. The solvent is not particularly limited as far as the solvent is inactive to the polymerization initiator and does not adversely affect the polymerization reaction. Examples thereof include an aliphatic hydrocarbon and an aromatic hydrocarbon, such as hexane, heptane, octane, decane, toluene, benzene, and xylene. The polymerization reaction is generally performed at a temperature of from 0 to 80° C., and preferably from 10 to 70° C., for from 0.5 to 50 hours, and preferably from 1 to 30 hours.

For controlling the glass transition temperature of the polymer block (B-2) of the hydrogenated block copolymer (b-2) to a range of −45° C. or more, it is preferred that a Lewis base is used as a co-catalyst in the polymerization, and the vinyl content of the polymer block (B-2) of the hydrogenated block copolymer (b-2) is controlled to the above preferred range.

For controlling the glass transition temperature of the polymer block (B-1) of the hydrogenated block copolymer (b-1) to a range of less than −45° C., it is preferred that the Lewis base is not used, or in the case where the Lewis base is used, it is added in an amount of less than 0.5 part by mass per 100 parts by mass of the monomer applied to the polymerization, and the vinyl content of the polymer block (B-1) of the hydrogenated block copolymer (b-1) is controlled to the above preferred range.

Examples of the Lewis base include an ether compound, such as dimethyl ether, diethyl ether, and tetrahydrofuran, a glycol ether compound, such as ethylene glycol dimethyl ether and diethylene glycol dimethyl ether, and an amine compound, such as triethylamine, N,N,N',N'-tetramethylenediamine, and N-methylmorpholine. The Lewis base may be used solely or as a combination of two or more kinds thereof.

The amount of the Lewis base added may be determined depending on the vinyl content of the polymer block (B) to be controlled. Accordingly, there is no limitation in a strict meaning on the amount of the Lewis base added, and the Lewis base is generally used in an amount of from 0.1 to 1,000 mol, and preferably from 1 to 100 mol, per 1 gram atom of lithium contained in the alkyllithium compound or the dilithium compound used as the polymerization initiator.

The block copolymer (b-1) and the block copolymer (b-2) that are not hydrogenated can be obtained in such a manner that after performing the polymerization by the method described above, the block copolymer contained in the polymerization reaction solution is aggregated by pouring into a poor solvent to the block copolymers, such as methanol, or the polymerization reaction solution is poured into hot water along with steam to remove the solvent through azeotropy (steam stripping), and then the block copolymer is dried.

Subsequently, the block copolymer obtained above is subjected to hydrogenation reaction, so as to produce the hydrogenated block copolymer (b-1) and the hydrogenated block copolymer (b-2) thus hydrogenated. The hydrogenation reaction may be performed in such a manner that the block copolymer obtained above is dissolved in a solvent that is inactive to the reaction and the hydrogenation catalyst, and is reacted with hydrogen in the presence of the hydrogenation catalyst, such as Raney nickel; a heterogeneous catalyst containing a support, such as carbon, alumina, and diatom earth, having supported thereon a metal, such as Pt, Pd, Ru, Rh, and Ni; a Ziegler catalyst containing a combination of a transition metal compound with an alkylaluminum compound, an alkyllithium compound, or the like; and a metallocene catalyst.

The hydrogenation reaction may be performed under a hydrogen pressure of generally from 0.1 to 20 MPa, and preferably from 0.5 to 15 MPa, at a reaction temperature of generally from 20 to 250° C., and preferably from 50 to 150°

C., for a reaction time of generally from 0.1 to 100 hours, and preferably from 1 to 50 hours.

The block copolymer may not be isolated from the polymerization reaction solution containing the block copolymer and the polymerization reaction solution may be subjected directly to the hydrogenation reaction. In the case of the method is used, the hydrogenated block copolymer (b-1) and the hydrogenated block copolymer (b-2) can be obtained in such a manner that the hydrogenated block copolymer is aggregated by pouring the hydrogenation reaction solution into a poor solvent, such as methanol, or the hydrogenation reaction solution is poured into hot water along with steam to remove the solvent through azeotropy (steam stripping), and then the hydrogenated block copolymer is dried.

The hydrogenated block copolymer (b-1) and the hydrogenated block copolymer (b-2) thus obtained may be pelletized by a known method to produce pellets of the hydrogenated block copolymer (b-1) and the hydrogenated block copolymer (b-2).

Examples of the pelletizing method include a method of extruding the hydrogenated block copolymer (b-1) and/or the hydrogenated block copolymer (b-2) from a single screw or twin screw extruder in a strand form, and then cut in water with a rotary blade disposed at the front of the die; and a method of extruding the hydrogenated block copolymer (b-1) and/or the hydrogenated block copolymer (b-2) from a single screw or twin screw extruder in a strand form, water-cooled or air-cooled, and then cut with a strand cutter. The resin composition (X) may be produced by kneading the resulting pellets with the polypropylene resin (a).

In the resin composition (X), the mass ratio ((a)/((a)+(b))) of the polypropylene resin (a) and the hydrogenated block copolymer (b) is from 61/100 to 95/100, preferably from 63/100 to 85/100, and more preferably from 65/100 to 80/100.

In the case where the mass ratio of the polypropylene resin (a) and the hydrogenated block copolymer (b) is in the range, it is expected that the polypropylene resin (a) forms a sea phase, whereas the hydrogenated block copolymer (b) forms an island phase or a bicontinuous structure, and thereby the bag breakage strength is enhanced through the above mechanism. By using the hydrogenated block copolymer (b) in an amount of 5% by mass or more, the flexibility, the transparency, and the bag breakage strength can be enhanced, and by using the same in an amount of 40% by mass or less, a uniform film can be obtained even by dry blending, stable extrusion moldability can be obtained, and agglutination of the inner layer of the film can be prevented from occurring to make a favorable feature for a liquid packaging container.

Additional Components

The resin composition (X) may contain, in addition to the polypropylene resin (a) and the hydrogenated block copolymer (b), an additive, such as an antioxidant, an ultraviolet ray absorbent, a light stabilizer, a colorant, and a crystal nucleating agent; a hydrogenated resin, such as a hydrogenated coumarone-indene resin, a hydrogenated rosin resin, a hydrogenated terpene resin, and an alicyclic hydrogenated petroleum resin; a tackifier resin, such as an aliphatic resin formed of an olefin or diolefin polymer; and an additional polymer, such as hydrogenated polyisoprene, hydrogenated polybutadiene, a hydrogenated styrene-butadiene random copolymer, a hydrogenated styrene-isoprene random copolymer, butyl rubber, polyisobutylene, polybutene, and a polyolefin elastomer other than the polypropylene resin (a), such as an ethylene-propylene copolymer, an ethylene-butylene copolymer, and a propylene-butylene copolymer, in such a range that does not impair the advantageous effects of the present invention. In the case where the film is applied to food and medical purposes, a softening agent is preferably not contained for preventing the softening agent from being eluted into the content.

Production Method of Film for Liquid Packaging Container

The film for a liquid packaging container of the present invention has at least one of a layer containing the resin composition (X). The production method of the film for a liquid packaging container is not particularly limited, and for example, the polypropylene resin (a), the hydrogenated block copolymer (b), and the additional components added depending on necessity are kneaded with a kneading device, such as a single screw extruder, a twin screw extruder, a kneader, a Banbury mixer, and a roll, so as to produce the resin composition (X), and then the resulting resin composition (X) is molded into a film by various molding methods. At this time, a multilayer laminated product with a layer formed of a resin composition other than the resin composition (X) may be produced as described later, and the resin compositions may be molded by co-extrusion molding with a multilayer T-die, or air-cooling or water-cooling inflation molding with a multilayer circular T-die. The temperature of the resin on molding is preferably from 150 to 300° C., and more preferably from 180 to 250° C.

Liquid Packaging Container

Liquid Packaging Container Having Single Layer

The film for a liquid packaging container of the present invention formed of the resin composition (X) may be used as a single layer in a liquid packaging container. In this case, the thickness of the single layer is preferably from 100 to 500 μm, more preferably from 110 to 400 μm, and further preferably from 120 to 300 Lm.

Figure 4:
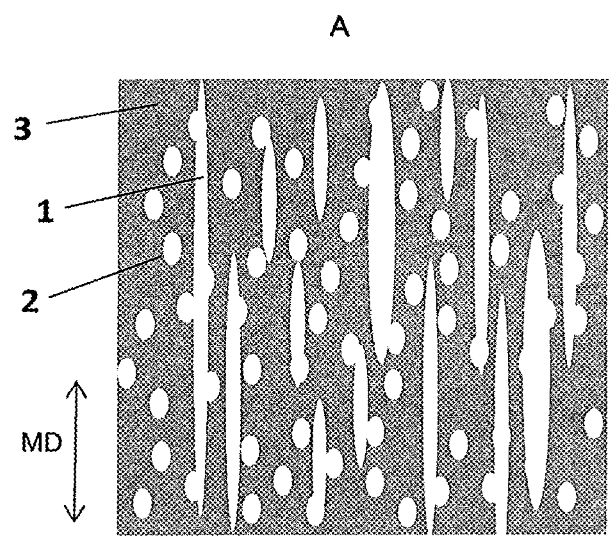
FIG. 4 is a schematic illustration showing an image of examples obtained by scanning with an atomic force microscope an inner layer or an intermediate layer of a film for a liquid packaging container along the machine direction (MD) in the film production.
Figure 5:
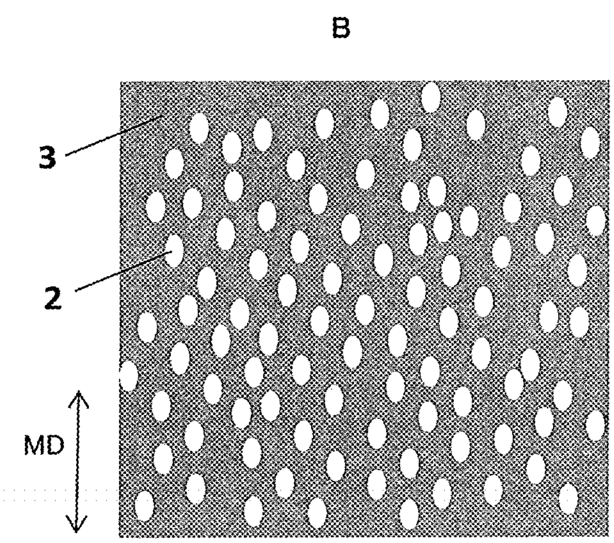
FIG. 5 is the schematic illustration showing the image of the comparative examples obtained by scanning with an atomic force microscope the inner layer or the intermediate layer of the film for a liquid packaging container along the machine direction (MD) in the film production.
Figure 6:
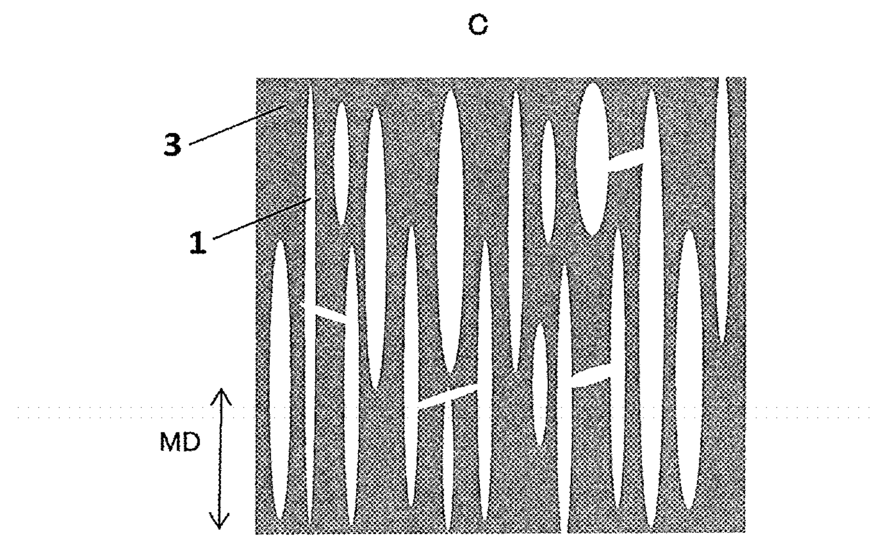
FIG. 6 is the schematic illustration showing the image of the comparative examples obtained by scanning with an atomic force microscope the inner layer or the intermediate layer of the film for a liquid packaging container along the machine direction (MD) in the film production.
Figure 7:
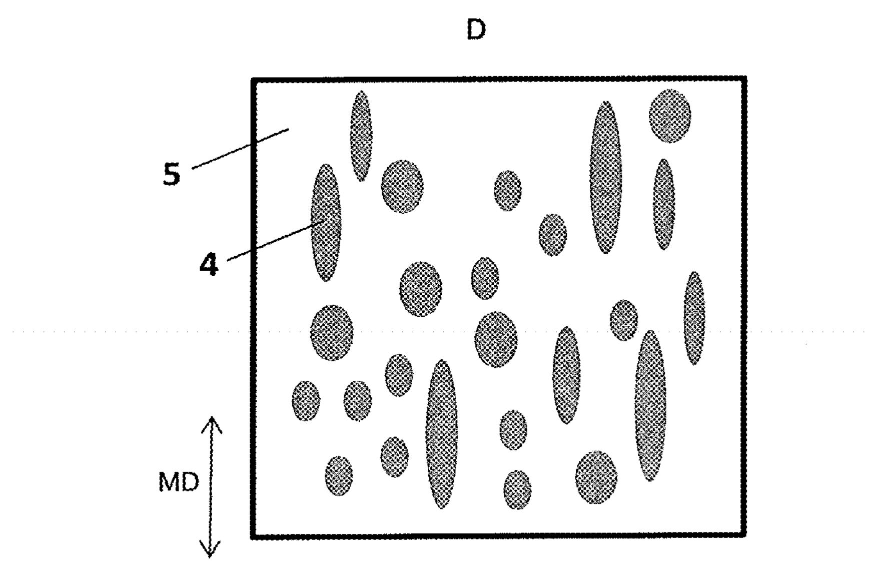
FIG. 7 is the schematic illustration showing the image of the comparative examples obtained by scanning with an atomic force microscope the inner layer or the intermediate layer of the film for a liquid packaging container along the machine direction (MD) in the film production.
Figure 8:
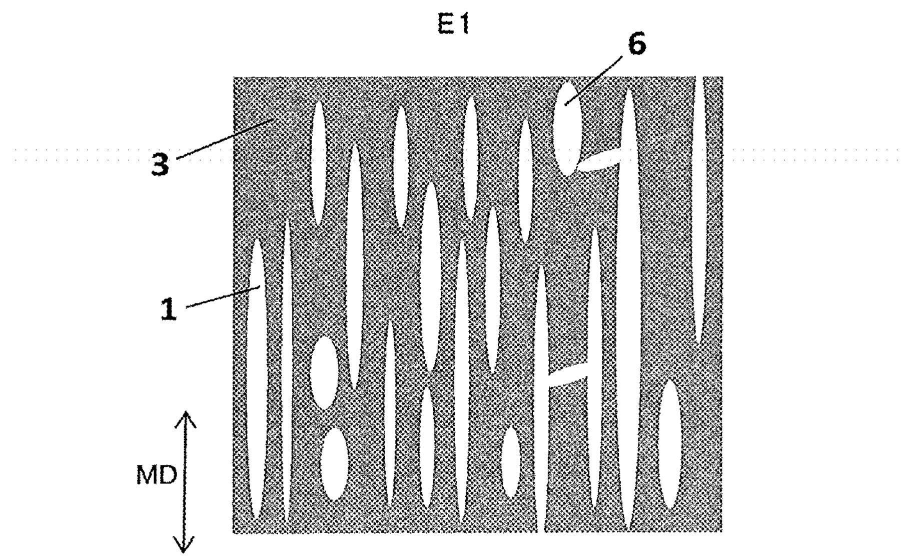
FIG. 8 is the schematic illustration showing the image of the comparative examples obtained by scanning with an atomic force microscope the inner layer or the intermediate layer of the film for a liquid packaging container along the machine direction (MD) in the film production.
Figure 9:
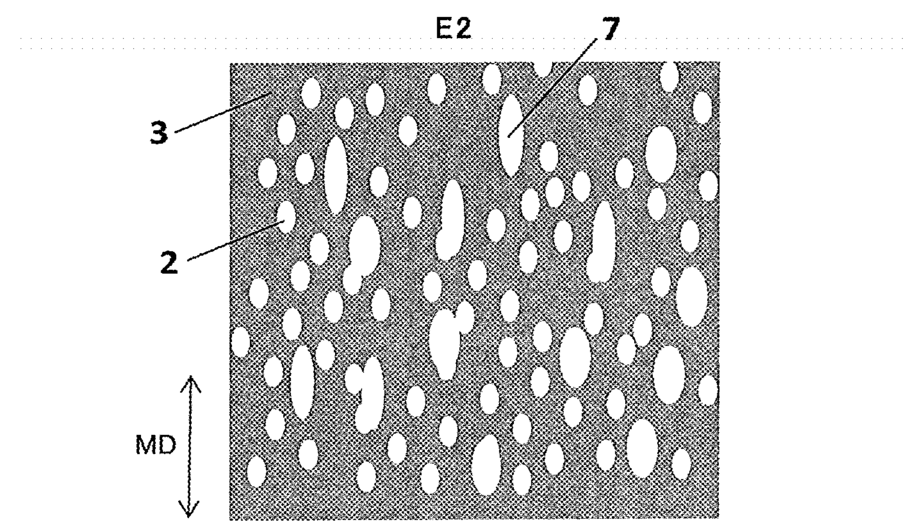
FIG. 9 is the schematic illustration showing the image of the comparative examples obtained by scanning with an atomic force microscope the inner layer or the intermediate layer of the film for a liquid packaging container along the machine direction (MD) in the film production.

In the case where the thickness of the single layer is in the range, when the layer having formed therein the particular morphology shown in FIG. 4 is partially cracked, the crack does not propagate in the thickness direction of the layer due to the above mechanism, but propagates substantially horizontally with respect to the surface of the single layer (that is to say, substantially parallel with respect to the surface of the single layer) at the intermediate within the thickness, thereby providing a good bag breakage strength even with a single layer.

Liquid Packaging Container Having Two Layers

The liquid packaging container having two layers is a liquid packaging container having at least two layers including an inner layer and an outer layer, in which the inner layer contains the resin composition (X), and the outer layer contains a resin composition (P) containing 70% by mass or more of a polypropylene resin (c) having a content of a propylene monomer unit of 60% by mol or more.

Inner Layer

The inner layer contains the resin composition (X) containing the polypropylene resin (a) and at least one of the hydrogenated block copolymer (b), and the hydrogenated block copolymer (b) preferably contains the hydrogenated block copolymer (b-1) and the hydrogenated block copolymer (b-2) that are different in glass transition temperature. The resin composition (X) has been described above, and the description for the composition thereof is omitted herein.

Outer Layer

The material of the outer layer, which is a layer in contact with the outside air when used as a liquid packaging container, will be described. The outer layer contains a resin composition (P) containing 70% by mass or more, and preferably from 80 to 95% by mass, of a polypropylene resin (c) having a content of a propylene monomer unit of 60% by mol or more. When the outer layer contains 70% by mass or more of a polypropylene resin (c), the resulting film is prevented from being damaged and is excellent in strength, and thus the film is favorably used as a liquid packaging container.

Example of the polypropylene resin (c) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. A modified polypropylene resin obtained through graft copolymerization of the polypropylene resin with a modifier, examples of which include an unsaturated monocarboxylic acid, such as acrylic acid, methacrylic acid, and crotonic acid; an unsaturated dicarboxylic acid, such as maleic acid, citraconic acid, and itaconic acid; an ester, an amide, or an imide of the unsaturated monocarboxylic acid or the unsaturated dicarboxylic acid; and an unsaturated dicarboxylic acid anhydride, such as maleic anhydride, citraconic anhydride, and itaconic anhydride may be used, but the polypropylene resin (c) is preferably one that is not modified.

Among these, from the standpoint of the relative inexpensiveness and the easy availability, homopolypropylene, a propylene-ethylene random copolymer, and a propylene-ethylene block copolymer are preferred, homopolypropylene and a propylene-ethylene random copolymer are more preferred, and homopolypropylene is further preferred.

The melting point of the polypropylene resin (c) is preferably from 140 to 180° C., and more preferably from 150 to 180° C. The polypropylene resin (c) preferably has a difference in melting point from the polypropylene resin (a) contained in the resin composition (X) constituting the inner layer of 10° C. or more, and more preferably 30° C. or more, from the standpoint of the heat sealing property.

As for the resin composition (P) constituting the outer layer, the melting point $MP_x$ of the resin composition (X) constituting the inner layer and the melting point $MP_p$ of the resin composition (P) constituting the outer layer preferably satisfy the following inequality similarly from the standpoint of the heat sealing property.

$$0 < MP_p - MP_x \leq 50$$

Additional Component

The resin composition (P) may contain, in addition to the polypropylene resin (c), an additive, such as an antioxidant, an ultraviolet ray absorbent, a light stabilizer, a colorant, and a crystal nucleating agent; a hydrogenated tackifier resin, such as a hydrogenated coumarone-indene resin, a hydrogenated rosin resin, a hydrogenated terpene resin, and an alicyclic hydrogenated petroleum resin; a tackifier resin, such as an aliphatic resin formed of an olefin or diolefin polymer; and an additional polymer, such as hydrogenated polyisoprene, hydrogenated polybutadiene, a hydrogenated styrene-butadiene random copolymer, a hydrogenated styrene-isoprene random copolymer, butyl rubber, polyisobutylene, polybutene, a hydrogenated styrene elastomer (e.g., a styrene-ethylene-butylene-styrene block copolymer (SEBS), a styrene-ethylene-propylene-styrene block copolymer (SEPS), and a styrene-ethylene-ethylene-propylene-styrene block copolymer (SEEPS)), and a polyolefin elastomer (e.g., an ethylene-propylene copolymer, an ethylene-butylene copolymer, and a propylene-butylene copolymer), in such a range that does not impair the advantageous effects of the present invention.

The thickness of the liquid packaging container having two layers is preferably from 100 to 500 μm, more preferably from 110 to 400 μm, and further preferably from 120 to 300 μm. In the thickness, the proportion of the thickness of the outer layer is preferably from 5 to 40%, and more preferably from 7 to 30%, with respect to the thickness of the film forming the liquid packaging container. When the thickness of the outer layer is smaller than the range, there is a possibility that the liquid packaging container becomes insufficient in mechanical strength and heat resistance. Even when the thickness of the outer layer exceeds the range, there may be no large difference in mechanical strength and heat resistance, but there is a possibility that the packaging container is inferior in flexibility, bag breakage strength, and transparency.

In the case where the liquid packaging container is produced by heat-sealing the peripheral portion, as described in the upper part of FIG. 1, the liquid packaging container may be broken in some cases due to impact, fall or the like applied thereto. The breakage starts from the boundary between the portion of the inner layer that is heat-sealed and the portion thereof that is not heat-sealed. A crack starts from the boundary, and in the case where the particular morphology shown in FIG. 4 is not produced, the crack propagates toward the surface of the liquid packaging container to fail to provide a sufficient bag breakage strength, as shown in the crack propagation mode B in FIG. 1, and FIG. 3. In the case where the resin composition (X) is contained in the inner layer, on the other hand, it has been found that in the inner layer, the crack once propagates toward the surface of the liquid packaging container, but the crack toward the surface is terminated within the inner layer, and then propagates in the same direction as the interface direction of the inner layer and the intermediate layer as shown in the crack propagation mode A of FIG. 1 and the crack propagation mode A of FIG. 2, and it is considered as a result that the liquid packaging container is prevented from becoming unusable due to breakage, and the bag breakage strength is improved. The precise reason why the propagation direction of the crack is controlled or induced according to the crack propagation mode A is unclear, but can be expected as follows. Specifically, it is expected that even when the resin composition (X) constituting the inner layer is cracked, the crack propagates in the machine direction (MD) of the film for a liquid packaging container along the island phase having a long axis of 1 μm or more or the bicontinuous structure formed by the hydrogenated block copolymer (b) in the polypropylene resin (a) oriented in the machine direction (MD) of the film for a liquid packaging container in the resin composition (X), and thereby the crack is prevented from propagating in the thickness direction of the layer, thereby providing an excellent bag breakage strength. It is also expected on the other hand that the island phase having a long axis of 300 nm or less formed by the hydrogenated block copolymer (b) in the propylene resin (a) is dispersed substantially homogeneously in the resin composition (X), and thereby the layer formed of the resin composition (X) is excellent in flexibility and transparency.

Liquid Packaging Container Having Three-Layer Structure

The liquid packaging container having a three-layer structure is a liquid packaging container having a structure containing three or more layers that contains an inner layer, an outer layer, and at least one layer of an intermediate layer between the inner layer and the outer layer, in which the outer layer contains a resin composition (P) containing 70% by mass or more of a polypropylene resin (c) having a content of a propylene monomer unit of 60% by mol or more, and the resin composition (X) forms any of the inner layer and intermediate layer, the inner layer, and the intermediate layer. The melting point $MP_{in}$ of the resin component constituting the inner layer and the melting point $MP_{mid}$ of the resin component constituting the intermediate layer preferably satisfy the following inequality.

$$MP_{in}<MP_{mid}$$

Examples of the liquid packaging container having the three-layer structure include the following constitutions of the resin components of the inner layer, the intermediate layer, and the outer layer.

The first constitution contains the inner layer that is formed of a resin composition (X1), the intermediate layer that is formed of a resin composition (X2), and the outer layer that is formed of a resin composition (P).

The resin composition (P) of the outer layer may be the same one as described above. The resin composition (X1) of the inner layer and the resin composition (X2) of the intermediate layer each may be the same one as the resin composition (X), provided that the melting point $MP_{in}$ of the resin component (X1) constituting the inner layer and the melting point $MP_{mid}$ of the resin component (X2) constituting the intermediate layer satisfy the following inequality.

$$MP_{in}<MP_{mid}$$

The melting point $MP_{x1}$ of the resin composition (X1) constituting the inner layer and the melting point $MP_p$ of the resin composition (P) constituting the outer layer preferably satisfy the following inequality from the standpoint of the heat sealing property.

$$0<MP_p-MP_{x1}\leq 50$$

In this constitution, it is considered that the reason why the crack is prevented from propagating in the thickness direction is that the crack propagates in the machine direction of the film within the inner layer or the intermediate layer in the resin composition (X1) of the inner layer and the resin composition (X2) of the intermediate layer according to the above mechanism.

The second constitution contains the inner layer that is formed of a resin composition (X), the intermediate layer that is formed of a resin composition (Y), and the outer layer that is formed of a resin composition (P).

The resin composition (X) of the inner layer and the resin composition (P) of the outer layer may be the same as described above.

The resin composition (Y) of the intermediate layer may be any resin composition, provided that the melting point $MP_{in}$ of the resin composition (X) constituting the inner layer and the melting point $MP_{mid}$ of the resin composition (Y) constituting the intermediate layer satisfy the relationship of $MP_{in}<MP_{mid}$, and preferably satisfy the following inequality with respect to the melting point $MP_{out}$ of the resin composition (P) of the outer layer from the standpoint of the heat sealing property of the liquid packaging container.

$$MP_{in}<MP_{mid}\leq MP_{out}$$

The resin composition (Y) constituting the intermediate layer is not particularly limited as far as the above inequality is satisfied, and a resin composition containing from 50 to 100% by mass of a polypropylene resin is preferred, and a resin composition containing from 60 to 90% by mass of a polypropylene resin is more preferred. The polypropylene resin may be the same one as the polypropylene resin (c) described for the resin composition (P) constituting the outer layer.

The resin composition (Y) may contain, in addition to the polypropylene resin (c), another polyolefin, such as polyethylene, polybutadiene, an ethylene-propylene copolymer, polybutene, and partially crosslinked products thereof, in such a range that does not impair the advantageous effects of the present invention. The resin composition may also contain an additive, such as an antioxidant, an ultraviolet ray absorbent, a light stabilizer, a colorant, and a crystal nucleating agent; a hydrogenated resin, such as a hydrogenated coumarone-indene resin, a hydrogenated rosin resin, a hydrogenated terpene resin, and an alicyclic hydrogenated petroleum resin; a tackifier resin, such as an aliphatic resin formed of an olefin or diolefin polymer; and an additional polymer, such as hydrogenated polyisoprene, hydrogenated polybutadiene, a hydrogenated styrene-butadiene random copolymer, a hydrogenated styrene-isoprene random copolymer, butyl rubber, polyisobutylene, polybutene, a hydrogenated styrene elastomer (e.g., a styrene-ethylene-butylene-styrene block copolymer (SEBS), a styrene-ethylene-propylene-styrene block copolymer (SEPS), and a styrene-ethylene-ethylene-propylene-styrene block copolymer (SEEPS)), and a polyolefin elastomer (e.g., an ethylene-propylene copolymer, an ethylene-butylene copolymer, and a propylene-butylene copolymer).

In this constitution, it is considered that the reason why the crack is prevented from propagating in the thickness direction is that the crack propagates in the machine direction of the film within the inner layer in the resin composition (X) of the inner layer according to the above mechanism.

The melting point $MP_x$ of the resin composition (X) constituting the inner layer and the melting point $MP_p$ of the resin composition (P) constituting the outer layer preferably satisfy the following inequality from the standpoint of the heat sealing property.

$$0<MP_p-MP_x\leq 50$$

The third constitution contains the inner layer that is formed of a resin composition (Z), the intermediate layer that is formed of a resin composition (X), and the outer layer that is formed of a resin composition (P).

The resin composition (X) of the intermediate layer and the resin composition (P) of the outer layer may be the same as described above.

The resin composition (Z) of the inner layer may be any resin composition, provided that the melting point $MP_{in}$ of the resin composition (Z) constituting the inner layer and the melting point $MP_{mid}$ of the resin composition (X) constituting the intermediate layer satisfy the relationship of $MP_{in}<MP_{mid}$, and preferably satisfy the following inequality with respect to the melting point $MP_{out}$ of the resin composition (P) of the outer layer from the standpoint of the heat sealing property of the liquid packaging container.

$$MP_{in}<MP_{mid}\leq MP_{out}$$

The resin composition (Z) constituting the inner layer is not particularly limited as far as the above inequality is satisfied, and a resin composition containing from 50 to 100% by mass of a polypropylene resin is preferred, and a resin composition containing from 60 to 90% by mass of a polypropylene resin is more preferred. The polypropylene resin may be the same one as the polypropylene resin (c) described for the resin composition (P) constituting the outer layer.

The resin composition (Z) may contain, in addition to the polypropylene resin (c), another polyolefin, such as polyethylene, polybutadiene, an ethylene-propylene copolymer, polybutene, and partially crosslinked products thereof, in such a range that does not impair the advantageous effects of the present invention. The resin composition may also contain an additive, such as an antioxidant, an ultraviolet ray absorbent, a light stabilizer, a colorant, and a crystal nucleating agent; a hydrogenated resin, such as a hydrogenated coumarone-indene resin, a hydrogenated rosin resin, a hydrogenated terpene resin, and an alicyclic hydrogenated petroleum resin; a tackifier resin, such as an aliphatic resin formed of an olefin or diolefin polymer; and an additional polymer, such as hydrogenated polyisoprene, hydrogenated polybutadiene, a hydrogenated styrene-butadiene random copolymer, a hydrogenated styrene-isoprene random copolymer, butyl rubber, polyisobutylene, polybutene, a hydrogenated styrene elastomer (e.g., a styrene-ethylene-butylene-styrene block copolymer (SEBS), a styrene-ethylene-propylene-styrene block copolymer (SEPS), and a styrene-ethylene-ethylene-propylene-styrene block copolymer (SEEPS)), and a polyolefin elastomer (e.g., an ethylene-propylene copolymer, an ethylene-butylene copolymer, and a propylene-butylene copolymer).

In this constitution, it is considered that the reason why the crack is prevented from propagating in the thickness direction is that even when the crack propagates in the thickness direction in the inner layer and reaches the intermediate layer, the crack propagates in the machine direction of the film within the intermediate layer in the resin composition (X) of the intermediate layer according to the above mechanism.

The melting point $MP_z$ of the resin component (Z) constituting the inner layer in the case where the resin composition (X) constitutes the intermediate layer and the melting point $MP_p$ of the resin composition (P) constituting the outer layer preferably satisfy the following inequality from the standpoint of the heat sealing property.

$$0<MP_p-MP_z\leq 50$$

According to the above constitutions, the liquid packaging container of the present invention becomes a liquid packaging container that has good flexibility, transparency, a high heat seal strength, a high bag breakage strength at a low temperature and ordinary temperature, and low agglutination property of the inner layer, by using the resin composition (X) in the single layer structure, by using the resin composition (X) in the inner layer of the two-layer structure, or by using the resin composition (X) in any of the inner layer and intermediate layer, the inner layer, and the intermediate layer in the structure having three or more layers.

The thickness of the liquid packaging container containing the aforementioned three layers is preferably from 100 to 500 jam, more preferably from 110 to 400 μm, and further preferably from 120 to 300 μm. Within the thickness, while the thicknesses of the layers including the outer layer, the intermediate layer, and the inner layer may be appropriately controlled depending on the purpose, the outer layer is preferably from 4 to 50%, and more preferably from 7 to 30%, in terms of the ratio with respect to the thickness of the liquid packaging container, the intermediate layer is preferably from 30 to 95%, and more preferably from 35 to 80%, in terms of the ratio with respect to the thickness of the liquid packaging container, and the inner layer is preferably from 1 to 50%, and more preferably from 5 to 30%, in terms of the ratio with respect to the thickness of the liquid packaging container. Specifically, the thickness of the inner layer is preferably from 5 to 40 μm, and more preferably from 10 to 40 μm. The thickness of the intermediate layer is preferably from 100 to 300 μm, more preferably from 100 to 200 μm, and further preferably from 100 to 180 μm. The thickness of the outer layer is preferably from 15 to 120 μm, more preferably from 15 to 80 μm, and further preferably from 15 to 70 μm. When the thicknesses of the layers are in the ranges, the liquid packaging container may be excellent in balance among the flexibility, the bag breakage strength, and the transparency.

In the case where the layer ratios of the layers in the three-layer structure are in the above range, and the hydrogenated block copolymer (b) contains at least the hydrogenated block copolymer (b-1) and the hydrogenated block copolymer (b-2), the mass ratio ((b-1)/(b-2)) of the hydrogenated block copolymer (b-1) and the hydrogenated block copolymer (b-2) in the resin composition (X) is preferably from 95/5 to 60/40, and more preferably from 95/5 to 70/30, for the inner layer, and is preferably from 5/95 to 40/60, and more preferably from 5/95 to 30/70, for the intermediate layer. In the case where the proportion of the hydrogenated block copolymer (b-1) in the inner layer is large, it may facilitate the formation of the particular morphology shown in FIG. 4, whereas in the case where the proportion of the hydrogenated block copolymer (b-2) in the intermediate layer is large, the flexibility and the transparency of the film may be enhanced, and thus the liquid packaging container becomes excellent in balance among the flexibility, the bag breakage strength, and the transparency, in these cases.

In the case where the intermediate layer and/or the inner layer are constituted by the resin composition (X), and contain the hydrogenated block copolymer (b-1), excellent heat sealing property in low-temperature fusion is exhibited, as compared to the case where the hydrogenated block copolymer (b-1) is not contained. According to the constitution, the temperature range where the heat sealing can be performed may be broadened, and thereby a heat-sealed portion capable of being easily peeled off by the hand (easy peel portion) and a firmly heat-sealed portion can be provided by selecting the heat-sealing condition in the production of the container, which can be applied to a liquid packaging container having two or more housing compartments, such as a double-compartment bag.

In all the embodiments of the liquid packaging container described above, the liquid packaging container may further have an additional layer between two of the inner layer, the intermediate layer, and the outer layer, and on the surface of the outer layer, unless the advantageous effects of the present invention are impaired. Examples of the additional layer include an adhesive layer, a protective layer, a coating layer, a light reflective layer, a gas barrier layer, and a light absorbing layer.

In the liquid packaging container of the present invention, the inner layer and the intermediate layer are preferably in contact with each other, and the intermediate layer and the outer layer are preferably in contact with each other.

Production Method of Liquid Packaging Container

The production method of the liquid packaging container having at least two layers having the inner layer and the outer layer and the liquid packaging container having at least three layers having the inner layer, the intermediate layer, and the outer layer is not particularly limited. The film for a liquid packaging container (laminated product) of the present invention is formed by a known production method of a laminated product, the film is heat-sealed and then separated by cutting (cut out) to provide the liquid packaging container, which is further subjected to a sterilization treatment in the case of medical use. In the case where two or more housing compartments are to be provided, two or more housing compartments having an easy peel seal portion and a firmly heat-sealed portion can be formed by selecting the heat-sealing condition, which can be used as a double-compartment bag. When used as a double-compartment bag for an infusion solution, the easy peel seal portion which separates a content is easily opened by the hand and the content can be mixed. Since the periphery of the double-compartment bag for an infusion solution is strongly adhered by fusing, the contents are not leaked out during transportation, storage and handling, and since the easy peel portion has a certain adhesion strength, the contents are not mixed during transportation, storage and handling.

Preferred examples of the production method of the liquid packaging container include the following method. The resin compositions as materials for forming the layers each are kneaded with a kneading device, such as a single screw extruder, a twin screw extruder, a kneader, a Banbury mixer, and a roll. The resulting resin compositions each are molded into a film form, a sheet form, a tube form, or the like by co-extrusion molding with a multilayer T-die, or air-cooling or water-cooling inflation molding with a multilayer circular T-die. The temperature of the resin on molding is preferably from 150 to 300° C., and more preferably from 180 to 250° C. The cooling temperature in the air-cooling or water-cooling inflation molding is preferably from 7 to 70° C., and more preferably from 10 to 40° C. The film is preferably molded into a tube form from the standpoint of the production easiness of the liquid packaging container. With a molded article in a tube form, the liquid packaging container can be produced by heat-sealing and then separating (cutting out).

In the case of medical use, the liquid packaging container is then further subjected to a sterilization treatment, such as steam sterilization and autoclave sterilization. In the case of the autoclave sterilization, the heating temperature is preferably from 100 to 150° C., and more preferably from 110 to 140° C.

The liquid packaging container may have a port for charging a liquid, and a cap or the like including a rubber stopper for taking out the liquid, and thereby can be effectively utilized as a medical instrument, such as an infusion solution bag.

Medical Instrument

The medical instrument of the present invention contains the liquid packaging container, and examples of the medical instrument include an infusion solution bag.

Applications

The liquid packaging container of the present invention can be applied to various purposes. For example, the liquid packaging container can be effectively utilized as a medical container as described above, and also as a food packaging container for packaging retort foods, mayonnaise, ketchup, beverages, ice cream, and the like.

EXAMPLES

The present invention will be described specifically with reference to examples and the like, but the present invention is not limited to the examples in any way. The properties in Examples and Comparative Examples were measured or evaluated in the following manners.

Measurement and Evaluation Methods

Weight Average Molecular Weight (Mw)

The weight average molecular weight was obtained as a standard polystyrene conversion molecular weight by gel permeation chromatography (GPC).

Instrument: GPC Instrument "HLC-8020" (produced by Tosoh Corporation)

Separation columns: "TSKgel GMHXL", "G4000HXL", and "G5000HXL", produced by Tosoh Corporation, connected in series Eluent: tetrahydrofuran Flow rate of eluent: 1.0 mL/min Column temperature: 40° C.

Detection method: differential refractive index (RI)

Content of Polymer Block (A) in Hydrogenated Block Copolymer (b), and Amount of Vinyl Bond (Amount of 1,2-Bond and Amount of 3,4-Bond) of Polymer Block (B)

These content and amount were measured by a $^{1}$H-NMR measurement.

Instrument: Nuclear Magnetic Resonance Apparatus "ADVANCE 400 Nano bay" (produced by Bruker Corporation)

Solvent: deuterated chloroform

Hydrogenation Ratio of Polymer Block (B) in Hydrogenated Block Copolymer (b)

0.3 g of the block copolymer was measured for iodine value before and after the hydrogenation, and the hydrogenation ratio of the block copolymer was calculated from the ratio thereof.

Glass Transition Temperature

By using a differential scanning calorimeter "DSC6200", produced by Seiko Instruments, Inc., the hydrogenated block copolymer (b) was precisely weighed and heated from −120° C. to 100° C. at a temperature increasing rate of 10° C./min, and the temperature of the inflection point of the measured curve was read off and designated as the glass transition temperature.

Morphology

The cross section of the layer was observed for morphology with a scanning probe microscope "Probe Station SPI4000/Environmental Control Unit E-sweep", (produced by SII Nano Technology, Inc.). The specimen for the observation was prepared in such a manner that a sample having been frozen with liquid nitrogen was cut with an ultramicrotome using a glass knife to provide the cross section in the MD. In the observation, a phase image was obtained in the DFM mode for scanning sizes of 10×10 μm and 2×2 μm at ordinary temperature and ordinary pressure. In the resulting phase image, the hard region (the colored portion in the image) corresponds to the polypropylene resin (a), and the soft region (the portion shown by color close to white in the image) corresponds to the hydrogenated block copolymer (b).

The schematic illustrations shown in FIGS. 4 to 9 each schematically show the image obtained by scanning with a scanning probe microscope the inner layer or the intermediate layer of the film for a liquid packaging container along the machine direction (MD) in the film production. In the tables described later, the morphology was evaluated based on the following evaluation standard. The island phase having a long axis of 1 μm or more, or the bicontinuous structure was confirmed in the range of a scanning size of 10×10 μm, and the island phase having a long axis of 300 nm or less was confirmed in the range of a scanning size of 2×2 μm. The sizes of the island phases were obtained in such a manner that the island phases in the scanning size were measured with a ruler, and the resulting values were averaged.

The schematic illustrations shown in FIGS. 4 to 9 each schematically show the image obtained by scanning with an atomic force microscope the inner layer or the intermediate layer of the film for a liquid packaging container along the machine direction (MD) in the film production. In the tables described later, the morphology was evaluated based on the following evaluation standard.

A: The film has the hydrogenated block copolymer (b) having a phase separation structure that has both an island phase having a long axis of 1 μm or more, or a bicontinuous structure, and an island phase having a long axis of 300 nm or less.

B: The film has the hydrogenated block copolymer having a phase separation structure that has only an island phase having a long axis of 300 nm or less.

C: The film has the hydrogenated block copolymer having a phase separation structure that has only an island phase having a long axis of 1 μm or more, or a bicontinuous structure.

D: The film has a phase separation structure that has the hydrogenated block copolymer as a sea phase and the polypropylene resin (a) as an island phase.

E1: The film has the hydrogenated block copolymer having a phase separation structure that has an island phase having a long axis of 1 μm or more, or a bicontinuous structure, and an island phase having a long axis of larger than 300 nm (i.e., an island phase having a long axis of 300 nm or less is not found).

E2: The film has the hydrogenated block copolymer having a phase separation structure that has an island phase having a long axis of less than 1 μm, and an island phase having a long axis of 300 nm or less (i.e., an island phase having a long axis of 1 am or more, or a bicontinuous structure is not found).

Melting Point

By using a differential scanning calorimeter (DSC) "TGA/DSC1 Star System" (produced by Mettler-Toledo International Inc.), a specimen obtained by scraping the layer of the film was melted by heating from 30° C. to 250° C. at a temperature increasing rate of 10° C./min, then cooled from 250° C. to 30° C. at a temperature decreasing rate of 10° C./min, and then again heated from 30° C. to 250° C. at a temperature increasing rate of 10° C./min, and the peak top temperature of the main endothermic peak measured in the last temperature increase was designated as the melting point.

The test specimens of the single layer or multilayer films having thicknesses produced in Examples and Comparative Examples (hereinafter referred to as "laminated products" including the single layer products) each were measured and evaluated in the following manners.

1. Young's Modulus

A test specimen having a size of 25 mm×75 mm was prepared, and measured for Young's modulus under condition of 5 mm/min by using "Instron 3345" (produced by Instron Japan Co., Ltd.). A smaller value means better flexibility. The target value is 300 MPa or less.

2. Haze

The haze value (%) was measured by using a haze meter ("HR-100", produced by Murakami Color Research Laboratory Co., Ltd.) according to ASTM D-1003, and was designated as an index of the transparency.

A smaller haze value means better transparency, and the haze value is preferably 25% or less, more preferably 22% or less, and further preferably 20% or less.

3. Bag Breakage Strength (Ordinary Temperature)

The laminated product was cut out to a size of 15 cm×9 cm, two plies thereof were superimposed with the inner layers in contact with each other, three edges among the four edges thereof were heat-sealed under condition of 140° C., 0.4 MPa, and a heating time of 1 second, then 100 cc of water was charged therein through the one edge remaining open, and then the one edge was heat-sealed under the same condition as above, thereby producing a liquid packaging container having an internal capacity of 100 cc.

The resulting liquid packaging container was statically placed on a steel plate under an environment of 23° C., and a steel plate having a weight of 1 kg (9.8 N) was dropped thereon from the above three times. The same measurement was repeated with an increment of 3 cm, and the maximum height that did not break the bag was designated as an index of the bag breakage strength at ordinary temperature (23° C.). A larger value means a higher bag breakage strength at ordinary temperature. The value is preferably 40 cm or more.

4. Low Temperature Bag Breakage Strength

A liquid packaging container obtained in the same manner as in the item 3 above was statically placed on a steel plate under an environment of 4° C., and a steel plate having a weight of 1 kg (9.8 N) was dropped thereon from the above three times. The same measurement was repeated with an increment of 3 cm, and the maximum height that did not break the bag was designated as an index of the bag breakage strength at a low temperature (4° C.). A larger value means a higher low temperature bag breakage strength at ordinary temperature. The value is preferably 12 cm or more, and the value of 17 cm or more means particularly excellent bag breakage strength.

5. Crack Propagation Mode

After the test for the bag breakage strength in the item 3 above, the liquid packaging container was observed with a scanning electron microscope (SEM) for the crack propagating from the boundary between the portion of the inner layer that was heat-sealed and the portion thereof that was not heat-sealed, and evaluated based on the following evaluation standard.

A: The crack propagated in parallel to the plane direction of the laminated product along the interface between the inner layer and the intermediate layer (crack propagation mode A).

B: The crack propagated toward the surface of the laminated product (crack propagation mode B).

6. Moldability

For the moldability, the surging of the resulting film (i.e., the extrusion amount in molding process fluctuated, and the shape and the dimension of the product became irregular or fluctuated regularly) and the number of foreign matters and fisheyes due to kneading failure were evaluated based on the following evaluation standard, and were designated as an index of the moldability of the film.

A: The film cut out to 2 m in the MD had a thickness accuracy of less than ±10% in both the MD and the TD, and foreign matters and fisheyes were not confirmed visually.

B: The film cut out to 2 m in the MD had a thickness accuracy of less than ±10% in both the MD and the TD, but foreign matters and fisheyes were confirmed visually, or foreign matters and fisheyes were not confirmed visually, but the thickness accuracy was ±20% or more.

C: The film cut out to 2 m in the MD had a thickness accuracy of ±20% or more in both the MD and the TD, and foreign matters and fisheyes were confirmed visually.

7. Agglutination Property of Inner Layer

The laminated product was cut out to a size of 15 cm×9 cm, two plies thereof were superimposed with the inner layers in contact with each other, three edges among the four edges thereof were heat-sealed under condition of 140° C., 0.4 MPa, and a heating time of 1 second, and then the easiness of charging 100 cc of water therein through the upper portion of the one edge remaining open was evaluated based on the following evaluation standard.

A: Water was able to be easily charged.

B: Water was able to be charged, but a part of water spilled out due to slight agglutination of the inner layers.

C: The inner layers were agglutinated, and water was difficult to be charged.

8. Heat Seal Strength

The laminated products with the inner layers thereof in contact with each other were heat-sealed at temperatures of 110° C. and 120° C. under condition of 0.4 MPa and 1 second, thereby producing test pieces. The test pieces each were subjected to a 180° peeling test under condition of 300 mm/min by using "Instron 3345" (produced by Instron Japan Co., Ltd.). A larger value means a higher heat seal strength.

Raw Material Polymers Used in Examples

The details and the production methods of the components used in Examples and Comparative Examples are shown below.

Polypropylene Resin (a)

PP1: "PT-100" (produced by LCY Chemical Corporation), homopolypropylene, MFR: 1.6 g/10 min (230° C., 21.6 N), melting point: 164° C., propylene content: 100% by mol PP2: "SB-520Y" (produced by LOTTE Chemical Corporation), propylene-ethylene random copolymer, MFR: 2.4 g/10 min (230° C., 21.6 N), melting point: 154° C., propylene content: 97% by mol PP3: "SFC-750D" (produced by LOTTE Chemical Corporation), propylene-butene random copolymer, MFR: 5.8 g/10 min (230° C., 21.6 N), melting point: 130° C., propylene content: 90% by mol The properties thereof are also summarized in Table 1 below.

TABLE 1

| | Kind | Melting point (° C.) | MFR (g/10 min) | PP content (% by mol) |
|---|---|---|---|---|
| PP1 | homopolypropylene | 164 | 1.6 | 100 |
| PP2 | propylene-ethylene random copolymer | 154 | 2.4 | 97 |
| PP3 | propylene-butene random copolymer | 130 | 5.8 | 90 |

Production Examples of the hydrogenated block copolymers (b) used in Examples and Comparative Examples are shown below.

Production Example 1

In a pressure resistant vessel having been substituted by nitrogen and dried, 50.0 kg of cyclohexane as a solvent and 76 g of sec-butyllithium (10.5% by mass cyclohexane solution) as an anion polymerization initiator (8.0 g of sec-butyllithium) were charged, and 313 g of tetrahydrofuran as a Lewis base was charged. After heating to 50° C., 0.5 kg of styrene (1) was added and polymerized for 1 hour, subsequently a mixed liquid of 8.2 kg of isoprene and 6.5 kg of butadiene was added and polymerized for 2 hours, and further 1.5 kg of styrene (2) was added and polymerized for 1 hour, thereby providing a reaction solution containing a polystyrene-poly(isoprene/butadiene)-polystyrene triblock copolymer. To the reaction solution, palladium-carbon (palladium supported amount: 5% by mass) as a hydrogenation catalyst was added in an amount of 5% by mass based on the block copolymer, and reaction was performed under condition of a hydrogen pressure of 2 MPa and 150° C. for 10 hours. After radiational-cooling and releasing pressure, the palladium-carbon was removed by filtration, and the filtrate was concentrated and dried under vacuum, thereby providing a hydrogenated product of the polystyrene-poly(isoprene/butadiene)-polystyrene triblock copolymer (hereinafter referred to as a hydrogenated block copolymer HV1). The results of the property measurement of the hydrogenated block copolymer (HV1) are shown in Table 3.

Production Examples 2, 4 to 6, 8, 11 to 13, and 15

The hydrogenated block copolymers (b-2) (HV2, 5, 7, 10, 12, 15, 18, and 19) and the hydrogenated block copolymer (b-1) (LV2) having the properties shown in Table 3 were produced in the same manner as in Production Example 1 except that the formulation was changed to those shown in Table 2. In Table 3, "Ip/Bd" shows the mass ratio of the isoprene unit and the butadiene unit contained in the polymer block (B) in the hydrogenated block copolymer (b), "St content" shows the content (% by mass) of the styrene block in the entire hydrogen block copolymer (b), "Mw" shows the weight average molecular weight of the entire hydrogenated block copolymer (b), "Tg" shows the glass transition temperature of the hydrogenated block copolymer (b), "Vinyl content" shows the content ratio of the amount of the vinyl bond in the polymer block (B), and "Hydrogenation rate" shows the hydrogenation ratio of the polymer block (B).

Production Examples 3, 7, and 9

The hydrogenated block copolymers (b-2) (HV3, 11, and 13) having the properties shown in Table 3 were produced in the same manner as in Production Example 1 except that N,N,N',N'-tetramethylethylenediamine (TMEDA) was used as a Lewis base, and the kinds and the amounts of the monomers used were changed to those shown in Table 2.

Production Example 10

The hydrogenated block copolymer (b-2) (HV14) (a tetrablock copolymer having a polystyrene block and a polybutadiene block) having the properties shown in Table 3 was produced in the same manner as in Production Example 1 except that TMEDA was used as a Lewis base, and according to the formulation shown in Table 2, styrene (1) was added and polymerized for 1 hour, subsequently butadiene (1) was added and polymerized for 2 hours, further styrene (2) was added and polymerized for 1 hour, and further butadiene (2) was added and polymerized for 1 hour.

Production Examples 14, 16, and 18 to 24

The hydrogenated block copolymers (b-1) (LV1, 3, 5, 6, 7, 8, 9, 12, and 14) having the properties shown in Table 5 were produced in the same manner as in Production Example 1 except that no Lewis base was added, and the kinds and the amounts of the monomers used were changed to those shown in Table 4.

Production Example 17

The hydrogenated block copolymer (b-1) (LV4) (a mixture of a diblock copolymer and a triblock copolymer having a polystyrene block and a polyisoprene block) having the properties shown in Table 5 was produced in the same manner as in Production Example 1 except that no Lewis base was added, and according to the formulation shown in Table 4, styrene (1) was polymerized, subsequently isoprene was polymerized, and then 30 g of methyl benzoate as a coupling agent was added and reacted at 60° C. for 1 hour.

TABLE 2

| Hydrogenated block copolymer (b-2) | | Production Example 1 HV1 | Production Example 2 HV2 | Production Example 3 HV3 | Production Example 4 HV5 | Production Example 5 HV7 | Production Example 6 HV10 | Production Example 7 HV11 |
|---|---|---|---|---|---|---|---|---|
| Amount used (kg) | Cyclohexane | 50.0 | 50.0 | 50.0 | 49.9 | 49.9 | 50.0 | 50.0 |
| | sec-Butyllithium | 0.076 | 0.130 | 0.090 | 0.090 | 0.027 | 0.076 | 0.076 |
| | Styrene (1) | 0.5 | 1.8 | 1.0 | 0.7 | 0.5 | 0.5 | 0.5 |
| | Styrene (2) | 1.5 | 1.8 | 1.0 | 0.7 | 0.5 | 1.5 | 1.5 |
| | Isoprene | 8.2 | 13.2 | — | 8.5 | 4.3 | 8.2 | 8.2 |
| | Butadiene (1) | 6.5 | — | 14.6 | 6.8 | 3.4 | 6.5 | 6.5 |
| | Butadiene (2) | — | — | — | — | — | — | — |
| | Tetrahydrofuran | 0.31 | 0.29 | — | 0.31 | 0.29 | 0.31 | — |
| | TMEDA | — | — | 0.03 | — | — | — | 0.03 |

| Hydrogenated block copolymer (b-2) | | Production Example 8 HV12 | Production Example 9 HV13 | Production Example 10 HV14 | Production Example 11 HV15 | Production Example 12 HV18 | Production Example 13 HV19 |
|---|---|---|---|---|---|---|---|
| Amount used (kg) | Cyclohexane | 50.0 | 50.0 | 50.0 | 50.0 | 50.0 | 50.0 |
| | sec-Butyllithium | 0.076 | 0.076 | 0.110 | 0.380 | 0.076 | 0.166 |
| | Styrene (1) | 0.5 | 1.0 | 1.1 | 2.5 | 0.5 | 1.5 |
| | Styrene (2) | 1.5 | 1.0 | 1.1 | 7.5 | 1.5 | 1.5 |
| | Isoprene | 12.2 | 3.5 | — | 3.7 | 8.2 | 13.6 |
| | Butadiene (1) | 2.4 | 11.1 | 13.6 | 3.0 | 6.5 | |
| | Butadiene (2) | — | — | 0.8 | — | — | — |
| | Tetrahydrofuran | 0.19 | — | — | 0.31 | 0.31 | 0.29 |
| | TMEDA | — | 0.03 | 0.03 | — | — | — |

TABLE 3

| | | | Ip/Bd | St content (% by mass) | Mw | Tg (° C.) | Vinyl content (%) | Hydrogenation ratio (%) |
|---|---|---|---|---|---|---|---|---|
| Hydrogenated block copolymer (b-2) | Production Example 1 | HV 1 | 55/45 | 12 | 150,000 | −32 | 60 | 90 |
| | Production Example 2 | HV 2 | 100/0 | 20 | 100,000 | −13 | 55 | 85 |
| | Production Example 3 | HV 3 | 0/100 | 12 | 180,000 | −45 | 77 | 99 |
| | Production Example 4 | HV 5 | 55/45 | 8 | 150,000 | −32 | 60 | 92 |
| | Production Example 5 | HV 7 | 55/45 | 12 | 350,000 | −32 | 60 | 90 |
| | Production Example 6 | HV 10 | 55/45 | 12 | 150,000 | −32 | 60 | 97 |
| | Production Example 7 | HV 11 | 55/45 | 12 | 150,000 | −17 | 80 | 90 |
| | Production Example 8 | HV 12 | 80/20 | 12 | 150,000 | −20 | 60 | 90 |
| | Production Example 9 | HV 13 | 20/80 | 12 | 150,000 | −40 | 70 | 95 |
| | Production Example 10 | HV 14 | 0/100 | 12 | 150,000 | −45 | 75 | 97 |
| | Production Example 11 | HV 15 | 55/45 | 60 | 35,000 | −32 | 60 | 90 |
| | Production Example 12 | HV 18 | 55/45 | 12 | 150,000 | −32 | 60 | 60 |
| | Production Example 13 | HV 19 | 100/0 | 18 | 96,000 | −13 | 55 | 90 |

TABLE 4

| Hydrogenated block copolymer (b-1) | | Production Example 14 LV1 | Production Example 15 LV2 | Production Example 16 LV3 | Production Example 17 LV4 | Production Example 18 LV5 | Production Example 19 LV6 |
|---|---|---|---|---|---|---|---|
| Amount used (kg) | Cyclohexane | 50.0 | 50.0 | 50.0 | 50.0 | 50.0 | 50.0 |
| | sec-Butyllithium | 0.166 | 0.166 | 0.166 | 0.165 | 0.277 | 0.029 |
| | Styrene (1) | 1.5 | 1.5 | 1.5 | 2.2 | 2.5 | 0.9 |

TABLE 4-continued

| | | | | | | |
|---|---|---|---|---|---|---|
| Styrene (2) | 1.5 | 1.5 | 1.5 | — | 2.5 | 0.9 |
| Isoprene | 13.6 | — | 7.6 | 14.5 | 11.7 | 7.1 |
| Butadiene | — | 13.6 | 6.0 | — | — | — |
| Tetrahydrofuran | — | 0.11 | — | — | — | — |
| Methyl benzoate | — | — | — | 0.03 | — | — |

| Hydrogenated block copolymer (b-1) | | Production Example 20 LV7 | Production Example 21 LV8 | Production Example 22 LV9 | Production Example 23 LV12 | Production Example 24 LV14 |
|---|---|---|---|---|---|---|
| Amount used (kg) | Cyclohexane | 50.0 | 50.0 | 50.0 | 50.0 | 50.0 |
| | sec-Butyllithium | 0.365 | 0.166 | 0.145 | 0.913 | 0.076 |
| | Styrene (1) | 1.5 | 1.5 | 3.3 | 1.5 | 0.5 |
| | Styrene (2) | 1.5 | 1.5 | 3.3 | 1.5 | 1.5 |
| | Isoprene | 13.6 | 13.6 | 10.0 | 7.6 | 8.2 |
| | Butadiene | — | — | — | 6.0 | 6.5 |
| | Tetrahydrofuran | — | — | — | — | — |
| | Methyl benzoate | — | — | — | — | — |

TABLE 5

| | | | Ip/Bd | St content (% by mass) | Mw | Tg (° C.) | Vinyl content (%) | Hydrogenation ratio (%) |
|---|---|---|---|---|---|---|---|---|
| Hydrogenated block copolymer (b-1) | Production Example 14 | LV1 | 100/0 | 18 | 96,000 | −56 | 4 | 99 |
| | Production Example 15 | LV2 | 0/100 | 18 | 120,000 | −57 | 40 | 99 |
| | Production Example 16 | LV3 | 55/45 | 18 | 96,000 | −55 | 5 | 99 |
| | Production Example 17 | LV4 (triblock/diblock = 41/59) | 100/0 | 13 | 183,000/ 92,000 | −57 | 4 | 99 |
| | Production Example 18 | LV5 | 100/0 | 30 | 85,000 | −56 | 4 | 99 |
| | Production Example 19 | LV6 | 100/0 | 20 | 273,000 | −56 | 4 | 99 |
| | Production Example 20 | LV7 | 100/0 | 18 | 30,000 | −56 | 4 | 99 |
| | Production Example 21 | LV8 | 100/0 | 18 | 96,000 | −56 | 4 | 85 |
| | Production Example 22 | LV9 | 100/0 | 40 | 92,000 | −56 | 4 | 99 |
| | Production Example 23 | LV12 | 100/0 | 18 | 17,000 | −56 | 4 | 99 |
| | Production Example 24 | LV14 | 55/45 | 12 | 150,000 | −55 | 5 | 99 |

Examples 1 to 10

The polypropylene resin (a), the hydrogenated block copolymer (b-1), and the hydrogenated block copolymer (b-2) were melt-kneaded with a single screw kneading device at the mixing ratios shown in Table 6 below, thereby producing resin compositions, and films for a liquid packaging container having a single layer having a thickness of 200 μm were produced by using a water-cooled downward inflation molding machine under condition of a resin temperature of 200° C., a cooling water temperature of 20° C., and a line speed of 10 m/min. The properties of the resulting films are shown in Table 6.

TABLE 6

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Single layer composition | PP3 | part by mass | 70 | 70 | 70 | 70 | 70 | 70 | 65 | 80 | 70 | 70 |
| | HV1 | part by mass | 15 | | | | | | 17.5 | 10 | 5 | 25 |
| | HV2 | part by mass | | 15 | | | | | | | | |
| | HV5 | part by mass | | | 15 | | | | | | | |
| | HV7 | part by mass | | | | 15 | | | | | | |
| | HV10 | part by mass | | | | | 15 | | | | | |
| | HV11 | part by mass | | | | | | 15 | | | | |
| | LV1 | part by mass | 15 | 15 | 15 | 15 | 15 | 15 | 17.5 | 10 | 25 | 5 |
| | Thickness | μm | 130 | 130 | 130 | 130 | 130 | 130 | 130 | 130 | 130 | 130 |
| | (PP/(HV + LV)) | | 70/30 | 70/30 | 70/30 | 70/30 | 70/30 | 70/30 | 65/35 | 80/20 | 70/30 | 70/30 |
| | (HV/LV) | | 50/50 | 50/50 | 50/50 | 50/50 | 50/50 | 50/50 | 50/50 | 50/50 | 17/83 | 83/17 |
| | Morphology | | A | A | A | A | A | A | A | A | A | A |
| Properties of laminated product | | | | | | | | | | | | |
| (1) Young's modulus (before sterilization) | | MPa | 240 | 290 | 180 | 240 | 240 | 200 | 220 | 280 | 360 | 210 |
| (2) Haze | | % | 11 | 13 | 10 | 13 | 10 | 9 | 11 | 13 | 18 | 11 |
| (3) Bag breakage strength (ordinary temperature) | | cm | 80 | 60 | 80 | 80 | 80 | 80 | 80 | 70 | 50 | 40 |
| (4) Low temperature bag breakage strength | | cm | 17 | 12 | 18 | 17 | 17 | 6 | 21 | 12 | 17 | 12 |
| (5) Crack propagation mode | | | A | A | A | A | A | A | A | A | A | A |
| (6) Moldability | | | A | A | A | B | A | A | B | B | A | A |

Examples 11 to 51 and Comparative Examples 1 to 10

The materials of the inner layer, the materials of the intermediate layer, and the materials of the outer layer each were melt-kneaded with a single screw kneading device at the mixing ratios shown in Tables 7 to 11 below, thereby producing resin compositions, and films for a liquid packaging container having a three-layer structure having a thickness of 200 μm were produced by using a water-cooled downward inflation molding machine under condition of a resin temperature of 200° C., a cooling water temperature of 20° C., and a line speed of 10 m/min. The thicknesses of the layers were 20 μm for the inner layer, 130 μm for the intermediate layer, and 50 μm for the outer layer for Examples 11 to 44 and Comparative Examples 1 to 10. The properties of the resulting films are shown in Tables 7 to 11.

Figure 2:
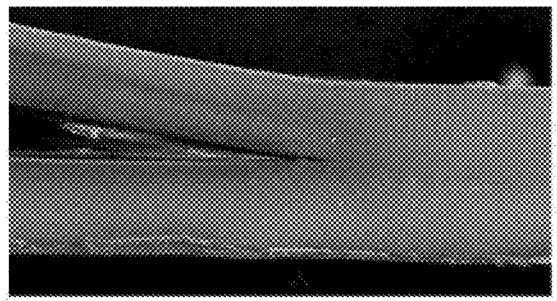
FIG. 2 is the micrograph with a scanning electron microscope on observation of the crack propagation mode in Example 1.
Figure 3:
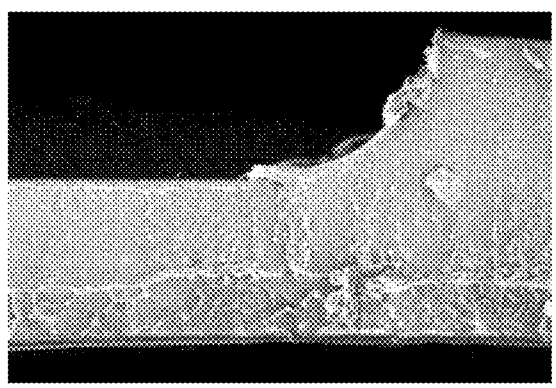
FIG. 3 is the micrograph with a scanning electron microscope on observation of the crack propagation mode in Comparative Example 1.

For Example 1 and Comparative Example 1, the micrographs of a scanning electron microscope (SEM) obtained in the observation of the crack propagation mode are shown in FIGS. 2 and 3, respectively.

TABLE 7

| | | | Example | | | | | | | | | | | Comparative Example | | |
|---|---|---|---|---|---|---|---|---|---|---|---|---|---|---|---|---|
| | | | 11 | 12 | 13 | 14 | 15 | 16 | 17 | 18 | 19 | 20 | 21 | 1 | 2 | 3 |
| Outer layer | PP1 | part by mass | 95 | 95 | 95 | 95 | 95 | 95 | 95 | 95 | 95 | 95 | 95 | 95 | 95 | 95 |
| | HV1 | part by mass | 5 | 5 | 5 | 5 | 5 | 5 | 5 | 5 | 5 | 5 | 5 | 5 | 5 | 5 |
| | Melting point | ° C. | 164 | 164 | 164 | 164 | 164 | 164 | 164 | 164 | 164 | 164 | 164 | 164 | 164 | 164 |
| | Thickness | μm | 50 | 50 | 50 | 50 | 50 | 50 | 50 | 50 | 50 | 50 | 50 | 50 | 50 | 50 |
| Intermediate layer | PP2 | part by mass | 70 | 70 | 70 | 70 | 70 | 70 | 70 | 70 | 70 | 70 | 70 | 70 | 70 | 70 |
| | HV1 | part by mass | 15 | | | | | | | | | 7.5 | 7.5 | | | |
| | HV2 | part by mass | | 15 | | | | | | | | 7.5 | 7.5 | | | |
| | HV3 | part by mass | | | 15 | | | | | | | | | | | |
| | HV5 | part by mass | | | | 15 | | | | | | | | | | |
| | HV7 | part by mass | | | | | 15 | | | | | | | | | |
| | HV10 | part by mass | | | | | | 15 | | | | | | | | |
| | HV11 | part by mass | | | | | | | 15 | | | | | | | |
| | HV12 | part by mass | | | | | | | | 15 | | | | | | |
| | HV13 | part by mass | | | | | | | | | 15 | | | | | |
| | HV14 | part by mass | | | | | | | | | | | 15 | | | |
| | HV15 | part by mass | | | | | | | | | | | | 15 | | |
| | HV18 | part by mass | | | | | | | | | | | | | 15 | |
| | LV1 | part by mass | 15 | 15 | 15 | 15 | 15 | 15 | 15 | 15 | 15 | 15 | 15 | 15 | 15 | 15 |
| | LV14 | part by mass | | | | | | | | | | | | | | 15 |
| | Melting point | ° C. | 154 | 154 | 154 | 154 | 154 | 154 | 154 | 154 | 154 | 154 | 154 | 154 | 154 | 154 |
| | Thickness | μm | 130 | 130 | 130 | 130 | 130 | 130 | 130 | 130 | 130 | 130 | 130 | 130 | 130 | 130 |
| Inner layer | PP3 | part by mass | 70 | 70 | 70 | 70 | 70 | 70 | 70 | 70 | 70 | 70 | 70 | 70 | 70 | 70 |
| | HV1 | part by mass | 15 | | | | | | | | | 7.5 | 7.5 | | | |
| | HV2 | part by mass | | 15 | | | | | | | | 7.5 | 7.5 | | | |
| | HV3 | part by mass | | | 15 | | | | | | | | | | | |
| | HV5 | part by mass | | | | 15 | | | | | | | | | | |
| | HV7 | part by mass | | | | | 15 | | | | | | | | | |
| | HV10 | part by mass | | | | | | 15 | | | | | | | | |
| | HV11 | part by mass | | | | | | | 15 | | | | | | | |
| | HV12 | part by mass | | | | | | | | 15 | | | | | | |
| | HV13 | part by mass | | | | | | | | | 15 | | | | | |
| | HV14 | part by mass | | | | | | | | | | | 15 | | | |
| | HV15 | part by mass | | | | | | | | | | | | 15 | | |
| | HV18 | part by mass | | | | | | | | | | | | | 15 | |
| | LV1 | part by mass | 15 | 15 | 15 | 15 | 15 | 15 | 15 | 15 | 15 | 15 | 15 | 15 | 15 | 15 |
| | LV14 | part by mass | | | | | | | | | | | | | | 15 |
| | Melting point | ° C. | 130 | 130 | 130 | 130 | 130 | 130 | 130 | 130 | 130 | 130 | 130 | 130 | 130 | 130 |
| | Thickness | μm | 20 | 20 | 20 | 20 | 20 | 20 | 20 | 20 | 20 | 20 | 20 | 20 | 20 | 20 |
| Morphology (intermediate layer and inner layer) | | | A | A | A | A | A | A | A | A | A | A | A | E1 | E1 | C |
| Properties of laminated product | | | | | | | | | | | | | | | | |
| (1) Young's modulus (before sterilization) | | MPa | 240 | 290 | 270 | 180 | 240 | 240 | 200 | 230 | 260 | 260 | 290 | 400 | 390 | 400 |
| (2) Haze | | % | 13 | 15 | 14 | 12 | 15 | 12 | 11 | 13 | 14 | 14 | 14 | 22 | 22 | 21 |
| (3) Bag breakage strength (ordinary temperature) | | cm | >100 | 80 | 90 | >100 | >100 | >100 | >100 | >100 | 90 | >100 | 80 | 55 | 50 | 50 |
| (4) Low temperature bag breakage strength | | cm | 21 | 16 | 21 | 22 | 21 | 21 | 10 | 12 | 23 | 17 | 19 | 8 | 10 | 8 |
| (5) Crack propagation mode | | | A | A | A | A | A | A | A | A | A | A | A | A | B | A |
| (6) Moldability | | | A | A | A | A | B | A | A | A | A | A | A | A | C | C |

TABLE 8

| | | | Example | | | | | | | | | | Comparative Example | |
|---|---|---|---|---|---|---|---|---|---|---|---|---|---|---|
| | | | 11 | 22 | 23 | 24 | 25 | 26 | 27 | 28 | 29 | 30 | 4 | 5 |
| Outer layer | PP1 | part by mass | 95 | 95 | 95 | 95 | 95 | 95 | 95 | 95 | 95 | 95 | 95 | 95 |
| | HV1 | part by mass | 5 | 5 | 5 | 5 | 5 | 5 | 5 | 5 | 5 | 5 | 5 | 5 |
| | Melting point | ° C. | 164 | 164 | 164 | 164 | 164 | 164 | 164 | 164 | 164 | 164 | 164 | 164 |
| | Thickness | μm | 50 | 50 | 50 | 50 | 50 | 50 | 50 | 50 | 50 | 50 | 50 | 50 |
| Intermediate layer | PP2 | part by mass | 70 | 70 | 70 | 70 | 70 | 70 | 70 | 70 | 70 | 70 | 70 | 70 |
| | HV1 | part by mass | 15 | 15 | 15 | 15 | 15 | 15 | 15 | 15 | 15 | 15 | 15 | 15 |
| | HV19 | part by mass | | | | | | | | | | | | 15 |
| | LV1 | part by mass | 15 | | | | | | | | 7.5 | | | |
| | LV2 | part by mass | | 15 | | | | | | | 7.5 | | | |
| | LV3 | part by mass | | | 15 | | | | | | | | | |
| | LV4 | part by mass | | | | 15 | | | | | | | | |
| | LV5 | part by mass | | | | | 15 | | | | | | | |
| | LV6 | part by mass | | | | | | 15 | | | | | | |
| | LV7 | part by mass | | | | | | | 15 | | | | | |
| | LV8 | part by mass | | | | | | | | 15 | | | | |
| | LV9 | part by mass | | | | | | | | | | 15 | | |
| | LV12 | part by mass | | | | | | | | | | | 15 | |
| | Melting point | ° C. | 154 | 154 | 154 | 154 | 154 | 154 | 154 | 154 | 154 | 154 | 154 | 154 |
| | Thickness | μm | 130 | 130 | 130 | 130 | 130 | 130 | 130 | 130 | 130 | 130 | 130 | 130 |
| Inner layer | PP3 | part by mass | 70 | 70 | 70 | 70 | 70 | 70 | 70 | 70 | 70 | 70 | 70 | 70 |
| | HV1 | part by mass | 15 | 15 | 15 | 15 | 15 | 15 | 15 | 15 | 15 | 15 | 15 | 15 |
| | HV19 | part by mass | | | | | | | | | | | | 15 |
| | LV1 | part by mass | 15 | | | | | | | | 7.5 | | | |
| | LV2 | part by mass | | 15 | | | | | | | 7.5 | | | |
| | LV3 | part by mass | | | 15 | | | | | | | | | |
| | LV4 | part by mass | | | | 15 | | | | | | | | |
| | LV5 | part by mass | | | | | 15 | | | | | | | |
| | LV6 | part by mass | | | | | | 15 | | | | | | |
| | LV7 | part by mass | | | | | | | 15 | | | | | |
| | LV8 | part by mass | | | | | | | | 15 | | | | |
| | LV9 | part by mass | | | | | | | | | | 15 | | |
| | LV12 | part by mass | | | | | | | | | | | 15 | |
| | Melting point | ° C. | 130 | 130 | 130 | 130 | 130 | 130 | 130 | 130 | 130 | 130 | 130 | 130 |
| | Thickness | μm | 20 | 20 | 20 | 20 | 20 | 20 | 20 | 20 | 20 | 20 | 20 | 20 |
| Morphology | | | A | A | A | A | A | A | A | A | A | A | E2 | B |
| Properties of laminated product | | | | | | | | | | | | | | |
| (1) Young's modulus (before sterilization) | | MPa | 240 | 240 | 240 | 220 | 260 | 240 | 240 | 270 | 240 | 290 | 240 | 180 |
| (2) Haze | | % | 13 | 13 | 13 | 12 | 15 | 14 | 13 | 15 | 13 | 17 | 12 | 11 |
| (3) Bag breakage strength (ordinary temperature) | | cm | >100 | >100 | >100 | 80 | 90 | >100 | >100 | 80 | >100 | 70 | 60 | 25 |
| (4) Low temperature bag breakage strength | | cm | 21 | 23 | 21 | 16 | 17 | 22 | 18 | 16 | 22 | 13 | 10 | 10 |
| (5) Crack propagation mode | | | A | A | A | A | A | A | A | A | A | A | B | B |
| (6) Moldability | | | A | A | A | A | A | B | A | A | A | C | C | A |

In Examples 31 to 36 and Comparative Examples 6 to 8, the mass ratio of the polypropylene resin (a) and the hydrogenated block copolymer (b) was changed.

TABLE 9

| | | | Example | | | | | | | Comparative Example | | |
|---|---|---|---|---|---|---|---|---|---|---|---|---|
| | | | 11 | 31 | 32 | 33 | 34 | 35 | 36 | 6 | 7 | 8 |
| Outer layer | PPI | part by mass | 95 | 95 | 95 | 95 | 95 | 95 | 95 | 95 | 95 | 95 |
| | HV1 | part by mass | 5 | 5 | 5 | 5 | 5 | 5 | 5 | 5 | 5 | 5 |
| | Melting point | ° C. | 164 | 164 | 164 | 164 | 164 | 164 | 164 | 164 | 164 | 164 |
| Intermediate layer | PP2 | part by mass | 70 | 62 | 80 | 90 | 70 | 70 | 70 | 80 | 90 | 40 |
| | HV1 | part by mass | 15 | 19 | 10 | 5 | 20 | 10 | 25 | 20 | 10 | 30 |
| | LV1 | part by mass | 15 | 19 | 10 | 5 | 10 | 20 | 5 | 0 | 0 | 30 |
| | Melting point | ° C. | 154 | 154 | 154 | 154 | 154 | 154 | 154 | 154 | 154 | 154 |
| Inner layer | PP3 | part by mass | 70 | 62 | 80 | 90 | 70 | 70 | 70 | 80 | 90 | 40 |
| | HV1 | part by mass | 15 | 19 | 10 | 5 | 20 | 10 | 25 | 20 | 10 | 30 |
| | LV1 | part by mass | 15 | 19 | 10 | 5 | 10 | 20 | 5 | 0 | 0 | 30 |
| | Melting point | ° C. | 130 | 130 | 130 | 130 | 130 | 130 | 130 | 130 | 130 | 130 |
| (PP/(HV + LV)) (intermediate layer and inner layer) | | | 70/30 | 62/38 | 80/20 | 90/10 | 70/30 | 70/30 | 70/30 | 80/20 | 90/10 | 50/50 |
| (HV + LV) (intermediate layer and inner layer) | | | 50/50 | 50/50 | 50/50 | 50/50 | 67/33 | 33/67 | 83/17 | 100/0 | 100/0 | 50/50 |
| Morphology | | | A | A | A | A | A | A | A | B | B | D |

TABLE 9-continued

| | | Example | | | | | | | Comparative Example | | |
|---|---|---|---|---|---|---|---|---|---|---|---|
| | | 11 | 31 | 32 | 33 | 34 | 35 | 36 | 6 | 7 | 8 |
| Properties of laminated product | | | | | | | | | | | |
| (1) Young's modulus (before sterilization) | MPa | 240 | 220 | 350 | 410 | 220 | 320 | 190 | 340 | 400 | 120 |
| (2) Haze | % | 13 | 13 | 15 | 15 | 11 | 15 | 11 | 14 | 14 | 25 |
| (4-1) Bag breakage strength | cm | >100 | >100 | 70 | 40 | 60 | >100 | 40 | 25 | 10 | 50 |
| (4-2) Crack propagation mode | | A | A | A | A | A | A | A | A | A | A |
| (5) Low temperature bag breakage strength | cm | 21 | 25 | 13 | 7 | 18 | 17 | 18 | 8 | 6 | 10 |
| (6) Internal agglutination property | | A | B | A | A | A | A | A | A | A | C |
| (7) Moldability | | A | A | A | A | A | A | A | A | A | C |

In Examples 37 to 44 and Comparative Examples 9 and 10, the mass ratio of the hydrogenated block copolymer (b-1) (corresponding to LV1 in the table) and the hydrogenated block copolymer (b-2) (corresponding to HV1 in the table) was changed in each of the inner layer and the intermediate layer.

TABLE 10

| | | | Example | | | | | | | | | Comparative Example | |
|---|---|---|---|---|---|---|---|---|---|---|---|---|---|
| | | | 11 | 37 | 38 | 39 | 40 | 41 | 42 | 43 | 44 | 9 | 10 |
| Outer layer | PP1 | part by mass | 95 | 95 | 95 | 95 | 95 | 95 | 95 | 95 | 95 | 95 | 95 |
| | HV1 | part by mass | 5 | 5 | 5 | 5 | 5 | 5 | 5 | 5 | 5 | 5 | 5 |
| | Melting point | ° C. | 164 | 164 | 164 | 164 | 164 | 164 | 164 | 164 | 164 | 164 | 164 |
| Intermediate layer | PP2 | part by mass | 70 | 70 | 70 | 70 | 70 | 70 | 70 | 70 | 70 | 70 | 70 |
| | HV1 | part by mass | 15 | 20 | 5 | 15 | 15 | 30 | 15 | 15 | 25 | 30 | 0 |
| | LV1 | part by mass | 15 | 10 | 25 | 15 | 15 | 0 | 15 | 15 | 5 | 0 | 30 |
| | Melting point | ° C. | 154 | 154 | 154 | 154 | 154 | 154 | 154 | 154 | 154 | 154 | 154 |
| Inner layer | PP3 | part by mass | 70 | 70 | 70 | 70 | 70 | 70 | 70 | 70 | 70 | 70 | 70 |
| | HV1 | part by mass | 15 | 15 | 15 | 5 | 25 | 15 | 30 | 0 | 5 | 30 | 0 |
| | LV1 | part by mass | 15 | 15 | 15 | 25 | 5 | 15 | 0 | 30 | 25 | 0 | 30 |
| | Melting point | ° C. | 130 | 130 | 130 | 130 | 130 | 130 | 130 | 130 | 130 | 130 | 130 |
| (HV/LV) (intermediate layer) | | | 50/50 | 67/33 | 17/83 | 50/50 | 50/50 | 100/0 | 50/50 | 50/50 | 83/17 | 100/0 | 0/100 |
| (HV/LV) (inner layer) | | | 50/50 | 50/50 | 50/50 | 17/83 | 83/17 | 50/50 | 100/0 | 0/100 | 17/83 | 100/0 | 0/100 |
| Morphology | | | A | A | A | A | A | A (inner layer) | A (intermediate layer) | A (intermediate layer) | A | B | C |
| Properties of laminated product | | | | | | | | | | | | | |
| (1) Young's modulus (before sterilization) | | MPa | 240 | 210 | 360 | 240 | 240 | 190 | 240 | 240 | 200 | 185 | 400 |
| (2) Haze | | % | 13 | 13 | 16 | 13 | 12 | 9 | 11 | 9 | 9 | 10 | 18 |
| (3) Bag breakage strength (ordinary temperature) | | cm | >100 | 80 | >100 | >100 | >100 | 70 | 60 | >100 | >100 | 60 | 60 |
| (4) Low temperature bag breakage strength | | cm | 21 | 19 | 24 | 22 | 17 | 20 | 19 | 22 | 25 | 7 | 7 |
| (5) Crack propagation mode | | | A | A | A | A | A | A | A | A | A | B | A |
| (6) Moldability | | | A | A | A | A | A | A | A | A | A | A | A |
| (7) Internal agglutination property | | | A | A | A | A | A | A | A | A | A | A | A |

In Examples 45 to 51, the formulations in Example 1 were used for the outer layer, the intermediate layer, and the inner layer, respectively, and only the thicknesses were changed.

TABLE 11

| | | Example | | | | | | | |
|---|---|---|---|---|---|---|---|---|---|
| | | 11 | 45 | 46 | 47 | 48 | 49 | 50 | 51 |
| Thickness of outer layer | μm | 50 | 20 | 40 | 55 | 100 | 10 | 0 | 100 |
| Thickness of intermediate layer | μm | 130 | 160 | 120 | 145 | 90 | 90 | 180 | 260 |
| Thickness of inner layer | μm | 20 | 20 | 40 | 5 | 10 | 100 | 20 | 40 |
| Total thickness of laminated product | μm | 200 | 200 | 200 | 200 | 200 | 200 | 200 | 400 |
| Properties of laminated product | | | | | | | | | |
| (1) Young's modulus (before sterilization) | MPa | 240 | 200 | 220 | 230 | 280 | 210 | 190 | 240 |
| (2) Haze | % | 13 | 13 | 12 | 13 | 13 | 13 | 13 | 14 |
| (3) Bag breakage strength (ordinary temperature) | cm | >100 | >100 | >100 | 70 | 80 | >100 | 70 | >100 |

TABLE 11-continued

| | | Example | | | | | | | |
|---|---|---|---|---|---|---|---|---|---|
| | | 11 | 45 | 46 | 47 | 48 | 49 | 50 | 51 |
| (4) Low temperature bag breakage strength | cm | 21 | 20 | 20 | 13 | 16 | 17 | 14 | 30 |
| (5) Crack propagation mode | | A | A | A | A | A | A | A | A |

As found from the above results, the liquid packaging container using the film for a liquid packaging container of the present invention is excellent in bag breakage strength while achieving excellent transparency and flexibility. It is considered that this is because the liquid packaging containers having an inner layer and/or an intermediate layer having a structure of the morphology A all exhibit the crack propagation mode A, i.e., the crack is prevented from propagating in the thickness direction of the layer.

Furthermore, for Examples 11, 40, and 41, and Comparative Example 9, the heat seal strength at 110° C. and 120° C. was measured in the case where the mass ratio of the hydrogenated block copolymer (b-1) (corresponding to LV1 in the table) and the hydrogenated block copolymer (b-2) (corresponding to HV1 in the table) was changed in each of the inner layer and the intermediate layer. As shown in Table 12, it is found that the liquid packaging container using the film for a liquid packaging container of the present invention has a high heat seal strength in this temperature range, and is excellent in low temperature heat sealing property.

TABLE 12

| | | | Example | | | Comparative Example |
|---|---|---|---|---|---|---|
| | | | 11 | 40 | 41 | 9 |
| Outer layer | PP1 | part by mass | 95 | 95 | 95 | 95 |
| | HV1 | part by mass | 5 | 5 | 5 | 5 |
| | Melting point | ° C. | 164 | 164 | 164 | 164 |
| Intermediate layer | PP2 | part by mass | 70 | 70 | 70 | 70 |
| | HV1 | part by mass | 15 | 30 | 15 | 30 |
| | LV1 | part by mass | 15 | 0 | 15 | 0 |
| | Melting point | ° C. | 154 | 154 | 154 | 154 |
| Inner layer | PP3 | part by mass | 70 | 70 | 70 | 70 |
| | HV1 | part by mass | 15 | 15 | 30 | 30 |
| | LV1 | part by mass | 15 | 15 | 0 | 0 |
| | Melting point | ° C. | 130 | 130 | 130 | 130 |
| (HV/LV) (intermediate layer) | | | 50/50 | 100/0 | 50/50 | 100/0 |
| (HV/LV) (inner layer) | | | 50/50 | 50/50 | 100/0 | 100/0 |
| Morphology | | | A | A (inner layer) | A (intermediate layer) | B |
| Heat seal strength (N/25 mm) | 110° C. | | 12 | 17 | 37 | 11 |
| | 120° C. | | 43 | 59 | 64 | 24 |

INDUSTRIAL APPLICABILITY

The liquid packaging container of the present invention can be applied to various purposes. For example, the liquid packaging container can be effectively utilized as a medical container as described above, and also as a food packaging container for packaging retort foods, mayonnaise, ketchup, beverages, ice cream, and the like.

REFERENCE SIGNS LIST

1: island phase having long axis of 1 m or more, or bicontinuous structure formed of hydrogenated block copolymer (b)

2: island phase having long axis of 300 nm or less formed of hydrogenated block copolymer (b)

3: sea phase formed of polypropylene resin (a)

4: island phase formed of polypropylene resin (a)

5: sea phase formed of hydrogenated block copolymer (b)

6: island phase having long axis of more than 300 nm formed of hydrogenated block copolymer (b)

7: island phase having long axis of less than 1 μm formed of hydrogenated block copolymer (b) MD represents the machine direction in the production of the film.

The invention claimed is:

1. A liquid packaging container, comprising:

a film for a liquid packaging container comprising:

at least one of a layer containing a resin composition (X) containing a polypropylene resin (a) and at least one of a hydrogenated block copolymer (b), the hydrogenated block copolymer (b) being a hydrogenated product of a block copolymer containing a polymer block (A) mainly containing an aromatic vinyl compound unit, and a polymer block (B) mainly containing an isoprene (Ip) unit, a butadiene (Bd) unit, or isoprene (Ip) and butadiene (Bd) units, in the resin composition (X), the hydrogenated block copolymer (b) having a phase separation structure having formed therein both (i) an island phase having a long axis of 1 mm or more, or a bicontinuous structure, and (ii) an island phase having a long axis of 300 nm or less, and in the resin composition (X), the mass ratio ((a)/((a)+(b))) of the polypropylene resin (a) and the hydrogenated block copolymer (b) being from 61/100 to 95/100, wherein the film has a structure containing three or more layers including at least one layer of an intermediate layer between an inner layer and an outer layer, the outer layer contains a resin composition (P) containing 70% by mass or more of a polypropylene resin (c) having a content of a propylene monomer unit of 60% by mol or more, the resin composition (X) forms any of the inner layer and intermediate layer, the inner layer, and the intermediate layer, and a melting point $MP_{in}$ of a resin component constituting the inner layer and a melting point $MP_{mid}$ of a resin component constituting the intermediate layer satisfy a following inequality: $MP_{in}<MP_{mid}$.

2. The liquid packaging container according to claim 1, wherein the hydrogenated block copolymer (h) contains at least a hydrogenated block copolymer (b-1) and a hydrogenated block copolymer (b-2) that are different in glass transition temperature, the hydrogenated block copolymer (b-1) has a glass transition temperature of less than −45° C., the hydrogenated block copolymer (b-2) has a glass transition temperature of −45° C. or more, and in the resin composition (X), the mass ratio ((b-1)/(b-2)) of the hydrogenated block copolymer (b-1) and the hydrogenated block copolymer (b-2) is from 5/95 to 95/5.

3. The liquid packaging container according to claim 2, wherein, with respect to the hydrogenated block copolymer (b-1) and the hydrogenated block copolymer (b-2), a hydrogenation ratio of the polymer block (B) is 80% by mol or more respectively.

4. The liquid packaging container according to claim 2, wherein the hydrogenated block copolymer (b-1) and the hydrogenated block copolymer (b-2) have a weight average molecular weight of from 20,000 to 500,000 respectively.

5. The liquid packaging container according to claim 2, wherein the polypropylene resin (a) contains 60% by mol or more of a propylene monomer unit, and has a melt flow rate of from 0.1 to 30 g/10 min under condition of 230° C. and a load of 21.6 N.

6. The liquid packaging container according to claim 2, wherein a melting point $MP_x$ of the resin composition (X) constituting the inner layer and a melting point $MP_p$ of the resin composition (P) constituting the outer layer satisfy a following inequality:

$$0<MP_p-MP_x\leq 50.$$

7. A medical instrument comprising the liquid packaging container according to claim 2.

8. The liquid packaging container according to claim 2, wherein the hydrogenated block copolymer (b-1) has a content of the polymer block (A) mainly containing an aromatic vinyl compound unit of from 5 to 38% by mass, or the hydrogenated block copolymer (b-2) has a content of the polymer block (A) mainly containing an aromatic vinyl compound unit of from 5 to 50% by mass.

9. The liquid packaging container according to claim 8, wherein, with respect to the hydrogenated block copolymer (b-1) and the hydrogenated block copolymer (b-2), a hydrogenation ratio of the polymer block (B) is 80% by mol or more respectively.

10. The liquid packaging container according to claim 8, wherein the hydrogenated block copolymer (b-1) and the hydrogenated block copolymer (b-2) have a weight average molecular weight of from 20,000 to 500,000 respectively.

11. The liquid packaging container according to claim 8, wherein the polypropylene resin (a) contains 60% by mol or more of a propylene monomer unit, and has a melt flow rate of from 0.1 to 30 g/10 min under condition of 230° C. and a load of 21.6 N.

12. The liquid packaging container according to claim 8, wherein a melting point $MP_x$ of the resin composition (X) constituting the inner layer and a melting point $MP_p$ of the resin composition (P) constituting the outer layer satisfy a following inequality:

$$0<MP_p-MP_x\leq 50.$$

13. A medical instrument comprising the liquid packaging container according to claim 8.

14. The liquid packaging container according to claim 1, wherein, with respect to the hydrogenated block copolymer (b), a hydrogenation ratio of the polymer block (B) is 80% by mol or more.

15. The liquid packaging container according to claim 1, wherein the hydrogenated block copolymer (b) has a weight average molecular weight of from 20,000 to 500,000.

16. The liquid packaging container according to claim 1, wherein the polypropylene resin (a) contains 60% by mol or more of a propylene monomer unit, and has a melt flow rate of from 0.1 to 30 g/10 min under condition of 230° C. and a load of 21.6 N.

17. The liquid packaging container according to claim 1, wherein a melting point $MP_x$ of the resin composition (X) constituting the inner layer and a melting point $MP_p$ of the resin composition (P) constituting the outer layer satisfy a following inequality:

$$0<MP_p-MP_x\leq 50.$$

18. A medical instrument comprising the liquid packaging container according to claim 1.

* * * * *